United States Patent
Sonawane et al.

(10) Patent No.: US 11,847,110 B2
(45) Date of Patent: *Dec. 19, 2023

(54) METHOD AND SYSTEM FOR SUPPORTING DATA CONSISTENCY ON AN ACTIVE STANDBY DATABASE AFTER DML REDIRECTION TO A PRIMARY DATABASE

(71) Applicant: Oracle International Corporation, Redwood Shores, CA (US)

(72) Inventors: Sachin Vijaykumar Sonawane, Redwood City, CA (US); Mahesh Baburao Girkar, Cupertino, CA (US); Yunrui Li, Fremont, CA (US); Thomas Baby, Maple Valley, CA (US); Vivekanandhan Raja, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,024

(22) Filed: Mar. 15, 2021

(65) Prior Publication Data

US 2021/0271663 A1    Sep. 2, 2021

Related U.S. Application Data

(63) Continuation of application No. 15/885,281, filed on Jan. 31, 2018, now Pat. No. 10,949,413.

(Continued)

(51) Int. Cl.
*G06F 16/23* (2019.01)
*G06F 16/27* (2019.01)
*G06F 11/14* (2006.01)

(52) U.S. Cl.
CPC ...... *G06F 16/2365* (2019.01); *G06F 16/2379* (2019.01); *G06F 16/275* (2019.01); *G06F 11/1458* (2013.01)

(58) Field of Classification Search
CPC . G06F 16/2365; G06F 16/2379; G06F 16/275
See application file for complete search history.

(56) References Cited

U.S. PATENT DOCUMENTS

| | | | |
|---|---|---|---|
| 8,738,568 B2 | 5/2014 | Ghosh et al. | |
| 2013/0282666 A1* | 10/2013 | McGee | G06F 16/275 707/E17.005 |

(Continued)

OTHER PUBLICATIONS

Oracle Corp., "Oracle Active Data Guard Real-Time Data Protection and Availability", Oct. 2015, Oracle White Paper, 1-21.

(Continued)

*Primary Examiner* — Giuseppi Giuliani
(74) *Attorney, Agent, or Firm* — Vista IP Law Group, LLP

(57) ABSTRACT

A database session in an active standby server on which an active standby database resides receives a DML statement. The session is suspended while the statement is redirected over a database link to a primary database on which the statement is executed. Information associated with execution of the statement is communicated to the session in the active standby server. Redo records describing changes to the contents of the primary database are applied to the active standby database and control is returned to the session. Prior to commitment of a transaction including the statement, a query directed to data to which the statement was directed is received at the active standby server from a client and executed on the active standby database absent use of a database link based on whether information associated with a database session associated with the client matches the information associated with execution of the statement.

20 Claims, 37 Drawing Sheets

Related U.S. Application Data

(60) Provisional application No. 62/566,287, filed on Sep. 29, 2017.

(56) References Cited

U.S. PATENT DOCUMENTS

| | | | | |
|---|---|---|---|---|
| 2014/0095452 | A1* | 4/2014 | Lee .................... | G06F 16/9535 707/683 |
| 2016/0179867 | A1* | 6/2016 | Li ....................... | G06F 16/383 707/649 |
| 2017/0017692 | A1* | 1/2017 | Das ..................... | G06F 16/2453 |
| 2018/0150363 | A1* | 5/2018 | Kim .................... | G06F 16/2308 |
| 2018/0150539 | A1* | 5/2018 | Andrei ................ | G06F 16/2379 |
| 2018/0246948 | A1* | 8/2018 | Florendo ............. | G06F 16/2455 |
| 2019/0102401 | A1* | 4/2019 | Neel .................... | G06F 11/2023 |
| 2021/0081372 | A1* | 3/2021 | Lee ..................... | G06F 9/5027 |

OTHER PUBLICATIONS

Oracle Corp., "Oracle Active Data Guard: What's Really Under the Hood", (Dec. 24, 2012), (Publication date based on indicated capture date by Archive.org; first publication date unknown).

"Snapshot 101: CoSnapshot 101: Copy-on-write vs Redirect-on-writepy-on-write vs Redirect-on-write", Apr. 1, 2016. Storage Switzerland, LLC, pp. 1-6.

SAP. "How to Perform System Replication for SAP HANA", Dec. 2017, SAP How-to-Guide, Business Analytics, Version 4.5, pp. 1-59.

IBM Redbooks. "High Availability and Disaster Recovery Options for DB2 for Linux, UNIX, and Windows", Oct. 2012, IBM, pp. 1-584.

Sybase, Inc. "Using Sybase Failover in a High Availability System", Sep. 2003. pp. 1-396.

SAP HANA. "Network Requirements", Oct. 2014, Version 1.0, SAP, pp. 1-32.

Oracle Corp., "Technical Comparison of Oracle Database 12c vs. Microsoft SQL Server 2012: Focus on High Availability", Nov. 2013, Oracle White Paper, pp. 1-68.

SAP. "How to Perform System Replication for SAP HANA", Jan. 2016, SAP How-to-Guide, Business Analytics, Version 4.0, pp. 1-52.

IBM Redbooks. "Content Manager OnDemand Backup, Recovery, and High Availability", Oct. 2005, IBM, pp. 1-384.

Knutsen, Lester. "Informix Best Practices Backup, Recovery, and High Availability Disaster Recovery (HDR)", Apr. 20, 2017, Advanced DataTools, pp. 1-62.

Non-Final Office Action dated May 19, 2020 for corresponding U.S. Pat. No. 10,949,413.

Notice of Allowance dated Oct. 28, 2020 for corresponding U.S. Pat. No. 10,949,413.

* cited by examiner

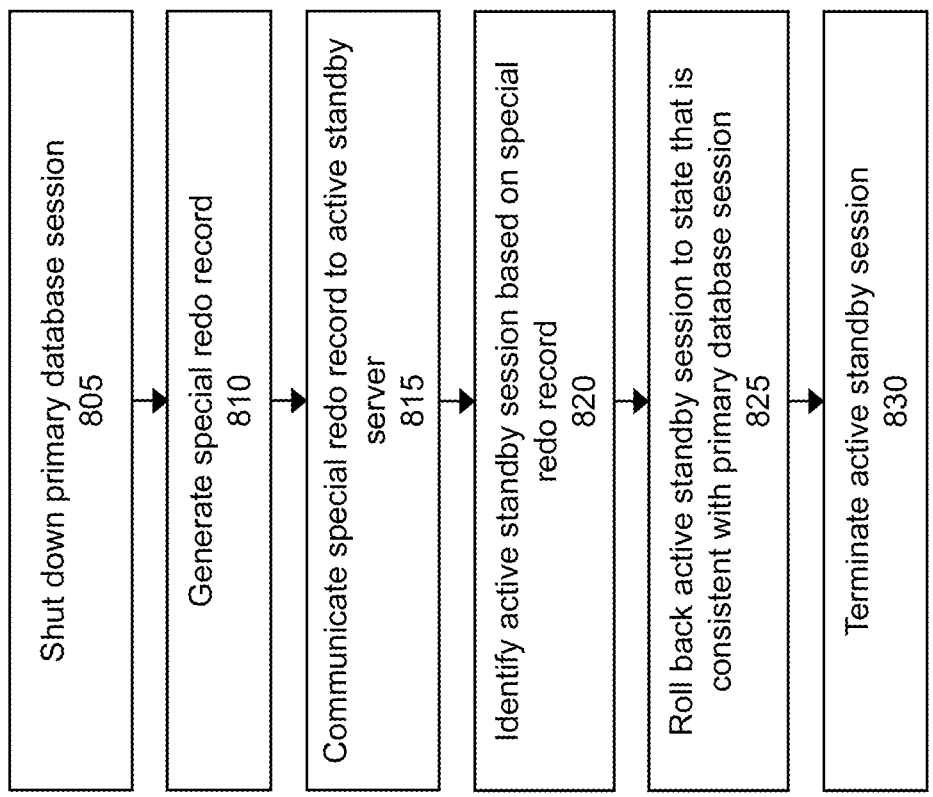

METHOD AND SYSTEM FOR SUPPORTING DATA CONSISTENCY ON AN ACTIVE STANDBY DATABASE AFTER DML REDIRECTION TO A PRIMARY DATABASE

RELATED APPLICATION

This present application is a continuation of U.S. application Ser. No. 15/885,281 titled "METHOD AND SYSTEM FOR SUPPORTING DATA CONSISTENCY ON AN ACTIVE STANDBY DATABASE AFTER DML REDIRECTION TO A PRIMARY DATABASE," filed on Jan. 31, 2018, which claims the benefit of U.S. Prov. App. No. 62/566,287 titled "METHOD AND SYSTEM FOR SUPPORTING DATA CONSISTENCY ON AN ACTIVE STANDBY DATABASE AFTER DML REDIRECTION TO A PRIMARY DATABASE," filed Sep. 29, 2017. The contents of the aforementioned U.S. patent application and U.S. provisional patent application are hereby explicitly incorporated by reference in their entireties for all purposes.

FIELD

This disclosure concerns a method, a computer program product, and a computer system for supporting data consistency on an active standby database after DML redirection to a primary database.

BACKGROUND

A physical standby database is a replica of a primary database, in which the data block structure of the physical standby database is physically the same as that of the primary database (i.e., the contents of the physical standby database are identical to the contents of the primary database on a block-for-block basis). Physical standby databases may be created to protect against disasters or data corruption. For example, if a primary database is destroyed or if data stored in the primary database is corrupted, a failover may be performed, such that a physical standby database becomes the new primary database. In situations in which a physical standby database is deployed, when changes are made to the contents of a primary database, information describing these changes are communicated to the physical standby database where the same changes are applied. Therefore, with the exception of any changes that have been made to the contents of a primary database that have not yet been applied to the contents of a physical standby database, the contents of the physical standby database are identical to the contents of the primary database in every way.

When changes are made to the contents of a database, information describing these changes are stored in a redo log. A redo log includes redo records that describe changes made in response to Data Manipulation Language (DML) statements directed to the contents of a database. DML statements include statements that begin with "MERGE," "INSERT," "UPDATE," "DELETE," etc., which may be used to access and manipulate data stored in a database. A redo log also includes undo records, which maintain information that may be used to undo uncommitted changes made to a database. Thus, a redo log contains a history of all changes made to the contents of a database and may be used to reconstruct changes made to the contents of a primary database when information maintained in the redo log is sent to a physical standby database and applied to its contents. For example, when redo records are generated in response to changes made to the contents of a primary database, these records are sent to a physical standby database where the same changes are made to ensure that the contents of the physical standby database remain identical to those of the primary database.

Conventionally, physical standby databases may have a read-only mode for reporting purposes that allow their resources to be more efficiently utilized. For example, when a physical standby database is in read-only mode, clients may access its contents by performing queries on the physical standby database. However, when in read-only mode, the operations that may be performed on physical standby databases are restricted to those that do not require any changes to be made to their contents. The reason for this limitation is that if a block of data stored in a physical standby database is changed by a DML statement and a redo record is subsequently received from a primary database that requires a different change to be made to the same block, the redo record may no longer be applicable to the data that is now stored in the block that was changed by the DML statement. Therefore, imposing the read-only limitation on physical standby databases is necessary to ensure that their contents are identical to the contents of the primary databases they are replicating so that the physical standby databases are immediately available in the event of a disaster or a failure. For this reason, physical standby databases will often prevent changes from being made to their contents by issuing an error if an attempt is made to do so.

However, this read-only limitation is problematic in that many reporting applications that may be run on physical standby databases may require occasional changes to be made to the contents of a database, which greatly limits the number of reporting applications that are able to be run on physical standby databases. Furthermore, there is no feasible way to efficiently or effectively make the necessary modifications to the code for such applications to allow them to be run on physical standby databases. Moreover, the capabilities of the reporting applications that may be run on physical standby databases are severely limited due to the read-only limitation on physical standby databases.

Therefore, there is a need for an improved approach to update physical standby databases.

SUMMARY

Embodiments of the present invention provide a method, a computer program product, and a computer system for supporting data consistency on an active standby database after DML redirection to a primary database.

According to some embodiments, a primary database and an active standby database (a synchronized physical replica of the primary database having read-only functionality) are implemented. A DML statement is received at a database session in an active standby server on which the active standby database resides. The database session in the active standby server is suspended while the DML statement is redirected to the primary database over a database link and executed on the primary database. The primary database communicates information associated with the execution of the DML statement (e.g., a transaction identifier, a system change number (SCN), and an undo block address) to the database session in the active standby server. The primary database also communicates redo records describing how the contents of the primary database were changed to the active standby database, allowing the same changes to be made to the active standby database. Once the corresponding changes have been made to the active standby database, control is returned to the database session in the active standby server. If a query is subsequently received at a database session in the active standby server, the results returned in response to the query may include changes made by the DML statement even if the changes have not been committed. The query is executed on the active standby database absent the use of a database link based on whether a database session at which the query is received is associated with information that matches the information associated with the execution of the DML statement. If the information matches, the results that are returned includes the changes made by the DML statement. However, if the information does not match, a set of undo records is applied to undo the changes made to the data before the results are returned. Thus, data consistency is preserved for queries directed to data that was changed within the same database session.

Further details of aspects, objects and advantages of the invention are described below in the detailed description, drawings and claims. Both the foregoing general description and the following detailed description are exemplary and explanatory, and are not intended to be limiting as to the scope of the invention.

BRIEF DESCRIPTION OF THE DRAWINGS

The drawings illustrate the design and utility of embodiments of the present invention, in which similar elements are referred to by common reference numerals. In order to better appreciate the advantages and objects of embodiments of the invention, reference should be made to the accompanying drawings. However, the drawings depict only certain embodiments of the invention, and should not be taken as limiting the scope of the invention.

The drawings use like reference numerals to identify like elements. A letter after a reference numeral, such as "120a," indicates that the text refers specifically to the element having that particular reference numeral. A reference numeral in the text without a following letter, such as "120," refers to any or all of the elements in the drawings bearing that reference numeral (e.g. "120" in the text refers to reference numerals "120a" and/or "120b" in the drawings).

FIG. 8 is a flow chart for terminating a database session in a server on which an active standby database resides in response to a shutdown of a corresponding database session in a server on which a primary database resides according to some embodiments of the invention.

DETAILED DESCRIPTION OF THE EMBODIMENTS OF THE INVENTION

Figure 1:
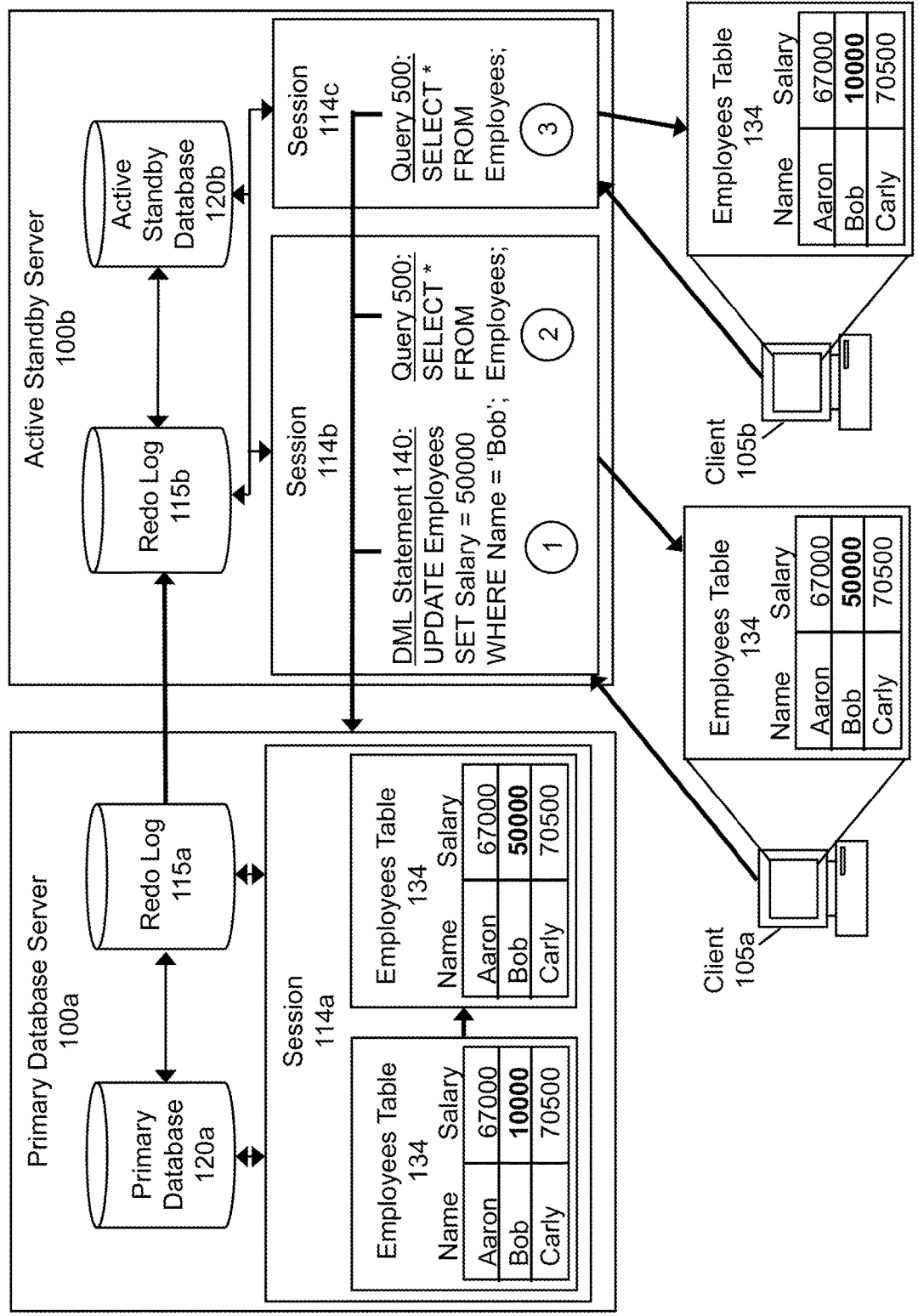
FIG. 1 illustrates a database system in which some embodiments of the invention are implemented.

The present disclosure provides an improved approach for supporting data consistency on an active standby database after DML redirection to a primary database.

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

An approach that attempts to solve the read-only limitation on physical standby databases involves performing a redirected change as well as a redirected read operation to a primary database. For example, a DML statement received at a physical standby database may be redirected to a primary database via a database link between database servers on which the physical standby database and the primary database reside. The DML statement is then executed on the primary database. If a query is subsequently received at the physical standby database that is directed to the data that was changed by the DML statement, the query may be redirected to the primary database as well, where the query is executed. The results of the query are then sent back to the physical standby database. However, this strategy is time-consuming due to the latency resulting from sending DML statements and queries back and forth between the databases.

This disclosure will now discuss an improved approach for supporting data consistency on an active standby database after DML redirection to a primary database. In this approach, a DML statement received at a database session in an active standby server on which the active standby database resides is redirected to the primary database over a database link and executed on a primary database. The primary database communicates information associated with the execution of the DML statement to the database session in the active standby server. The results returned in response to a query subsequently received at a database session in the active standby server may include uncommitted changes made by the DML statement based on whether a database session at which the query is received is associated with information that matches the information associated with the execution of the DML statement.

To demonstrate an improved approach for supporting data consistency on an active standby database after DML redirection to a primary database, FIG. 1 illustrates a database system in which some embodiments of the invention are implemented. In various embodiments, some aspects of the embodiments may be implemented separately or as a whole. For illustrative purposes, FIG. 1 shows a database system including a primary database server 100a on which a primary database 120a resides, an active standby server 100b on which an active standby database 120b resides, and two clients 105a-b. However, in various embodiments, a database system may include more or fewer database servers 100, databases 120, or clients 105 than depicted in FIG. 1. Furthermore, in some embodiments, conventional components of database servers 100 and/or clients 105, such as compilers, SQL engines, API layers, and the like are not shown so as to not obscure the components of the database system to be discussed with regard to FIG. 1.

As shown in FIG. 1, a database system may include several database servers 100a-b and clients 105a-b. The primary database server 100a manages data stored in the primary database 120a while the active standby server 100b manages data stored in the active standby database 120b. The active standby database 120b has read-only functionality and is a synchronized physical replica of the primary database 120a, such that its contents are identical to the contents of the primary database 120a on a block-for-block basis. The contents of the primary database 120a and the active standby database 120b may include various types of data that is stored in one or more physical datafiles. For example, data may be organized into tables and indexes, which are physically stored in datafiles in the primary database 120a and in the active standby database 120b. The clients 105a-b are connected to the active standby database 120b via database sessions or "sessions" 114b-c in the active standby server 110b.

In some embodiments, each database server 100a-b includes a redo log 115a-b, which stores a collection of redo records. The redo records describe changes to data stored in the databases 120a-b and are generated when these changes are made. For example, if a table of salaries for multiple employees stored in a database 120 is updated, a redo record is generated that describes how the data block for the table was changed. Thus, redo records allow changes made to the contents of a database 120 to be reconstructed. In some embodiments, to provide protection against failures involving the redo logs 115a-b, multiple copies of the redo logs 115a-b may be maintained for each database 120a-b (e.g., on different disks).

For each redo record stored in the redo logs 115a-b a corresponding undo record may also be stored in the redo logs 115a-b. Undo records include information that would allow uncommitted changes made to data stored in the databases 120a-b to be undone. Each undo record may describe how a change to a data block may be undone and a location at which this information is located (i.e., an undo block address (UBA)). Undo records may be used to provide read consistency when the same data is being accessed at the same time by different users. For example, suppose a first user makes changes to data in a table stored in a database 120 while a second user is accessing the same table at the same time. In this example, to maintain a read-consistent image of the data for the second user prior to commitment of the changes, undo records created when the first user made the changes may be applied to the data, such that the second user is provided with an image of the data that existed prior to the time that the uncommitted changes were made.

As illustrated in FIG. 1, redo and undo records stored in the redo log 115a at the primary database server 100a may be sent to and stored in a redo log 115b at the active standby server 100b. Once these records are received at the active standby server 100b, any changes made to the contents of the primary database 120a also may be made to the contents of the active standby database 120b. For example, when a column is deleted from a table stored in the primary database 120a, one or more redo records describing this change and the corresponding undo records may be created and stored in the redo log 115a at the primary database server 100a. In this example, these records also may be immediately sent to the active standby server 100b (i.e., before a client 105a has issued a COMMIT statement) where they may be stored in the redo log 115b at the active standby server 100b and the changes described in the redo records may be applied to the contents of the active standby database 120b. By applying the changes described by the redo records to the contents of the active standby database 120b, the contents of the active standby database 120b remain identical to the contents of the primary database 120a. Furthermore, by storing the redo and undo records in the redo log 115b at the active standby server 100b, the undo records may be used to provide consistent results in response to queries received at the active standby database 120b, as described below.

To illustrate an example of how the database system supports data consistency on the active standby database 120b after redirecting a DML statement 140 to the primary database 120a, suppose a connection is established between a first client 105a and the active standby database 120b, as illustrated in FIG. 1. Upon establishment of the connection, a session 114b is created in the active standby server 100b that allows an application running on the client 105a to use the session 114b to interact with the active standby database 120b. In some embodiments, the session 114b in the active standby server 100b may receive a DML statement 140 from the client 105a. For example, the client 105a may use the session 114b to issue the following DML statement 140: "UPDATE Employees SET Salary=50000 WHERE Name='Bob';" In this example, the DML statement 140 updates a record in a table 134 named "Employees" by updating a value in a column named "Salary" for a record having a value of "Bob" in the column named "Name."

When the session 114b in the active standby server 100b receives the DML statement 140 from the client 105a, the session 114b in the active standby server 100b is suspended and the DML statement 140 is redirected to the primary database 120a. In some embodiments, the DML statement 140 may be redirected to the primary database 120a over a database link (i.e., a connection between the active standby server 100b and the primary database server 100a, which allows the client 105a to access the databases 120a-b residing on both database servers 100a-b as a single logical database 120). For example, the active standby server 100b may create a database link to the primary database server 100*a* over which the DML statement 140 is forwarded to the primary database 120*a*. In embodiments in which the DML statement 140 is redirected to the primary database 120*a* over a database link, to increase the efficiency with which the active standby server 100*b* and the primary database server 100*a* are connected, the active standby server 100*b* may access a connection pool to determine whether a database link to the primary database server 100*a* already exists. If the active standby server 100*b* identifies an existing database link to the primary database server 100*a* in the connection pool, this database link is used to redirect the DML statement 140 to the primary database 120*a*; otherwise, the active standby server 100*b* establishes a new database link that is used to redirect the DML statement 140 to the primary database 120*a*.

Once the DML statement 140 is received at the primary database server 100*a*, the DML statement 140 may be executed. As shown in FIG. 1, to execute the DML statement 140, a session 114*a* is spawned in the primary database server 100*a* upon receiving the DML statement 140. This session 114*a* is associated with the session 114*b* in the active standby server 100*b* (currently suspended) that received the DML statement 140. The DML statement 140 is executed by updating the value stored in the Salary column of the Employees table 134 for the record having a value of "Bob" in the Name column from 10000 to 50000. As described above, one or more redo records describing this change and the corresponding undo records may be generated and stored in the redo log 115*a* at the primary database server 100*a*. As also described above, these records may be immediately sent to the active standby server 100*b* (i.e., before the client 105*a* has issued a COMMIT statement), where they may be stored in the redo log 115*b* and the same change may be applied to the contents of the active standby database 120*b*. When the change is applied to the contents of the active standby database 120*b*, control is returned to the 114*b* in the active standby server 100*b*.

As illustrated in FIG. 1, the active standby server 100*b* may receive a query 500 from the client 105*a* from which the DML statement 140 was received at the same session 114*b* at which the DML statement 140 was received. If the query 500 is directed to data that was updated by the DML statement 140, the update may be included in the results that are returned when the query 500 is executed. For example, if the client 105*a* issues the following query 500: "SELECT*FROM Employees;" since the client 105*a* is requesting all the records from the Employees table 134, the Employees table 134 that is returned to the client 105*a* includes the record changed by the DML statement 140 and will include the update. Furthermore, this updated Employees table 134 is returned upon execution of the query 500 regardless of whether the update has been made permanent (i.e., regardless of whether the client 105*a* has issued a COMMIT statement).

However, as shown in FIG. 1, if the active standby server 100*b* receives the same query 500 from a different client 105*b* prior to commitment of the update to the Employees table 134, a different set of results will be returned to this client 105*b* upon execution of the query 500. In this situation, another session 114*c*, which is different from the session 114*b* at which the DML statement 140 was received, is created when client 105*b* establishes a connection to the active standby database 120*b*. In order to provide a read-consistent image of the Employees table 134 for client 105*b*, upon execution of the query 500, undo records that were created when the DML statement 140 was executed on the primary database 120*a* and which were sent to the active standby server 100*b* from the primary database server 100*a* may be applied to the Employees table 134 before it is returned to the client 105*b*. Therefore, client 105*b* is provided with an image of the data that existed prior to the time that the uncommitted update was made (i.e., client 105*b* is provided with an Employees table 134 showing Bob's salary to be 10000).

Figure 2:
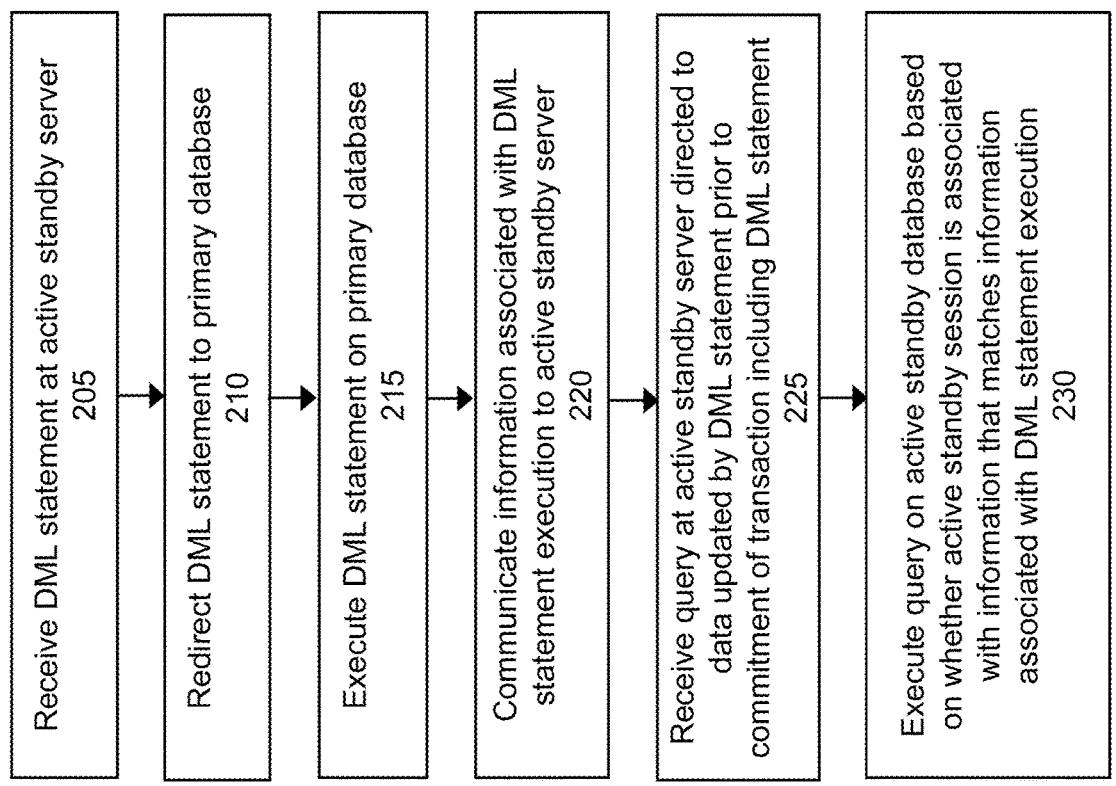
FIG. 2 is a flowchart for supporting data consistency on an active standby database after redirecting a DML, statement to a primary database according to some embodiments of the invention.

FIG. 2 is a flowchart for supporting data consistency on an active standby database after redirecting a DML statement to a primary database according to some embodiments of the invention. Some of the steps illustrated in the flowchart are optional in different embodiments. In some embodiments, the steps may be performed in an order different from that described in FIG. 2. Some of the steps of FIG. 2 are discussed below in conjunction with FIGS. 3A-3K, which illustrate an example of supporting data consistency on an active standby database after redirecting a DML statement to a primary database according to some embodiments of the invention.

Figure 3A:
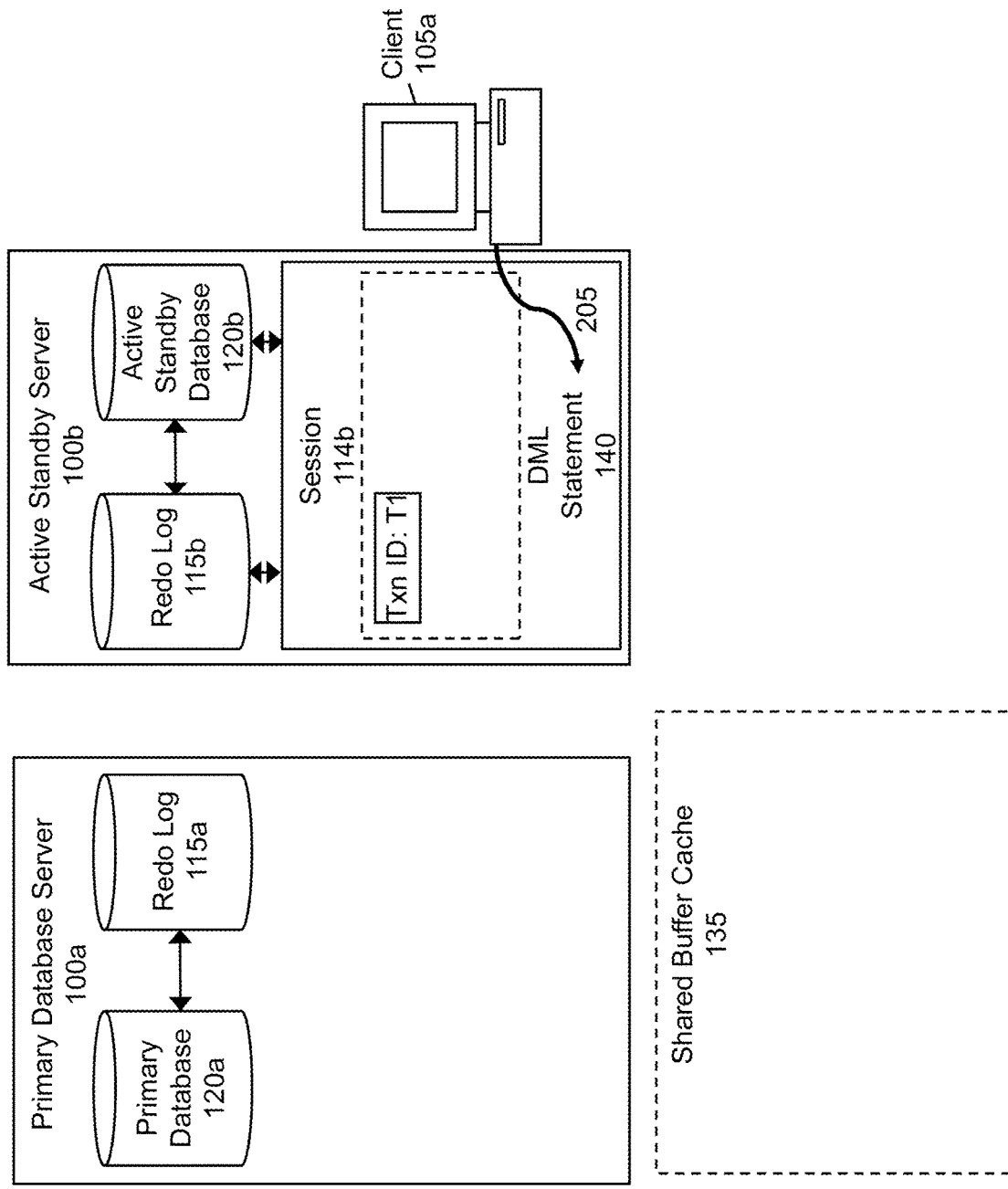
FIGS. 3A-3K illustrate an example of supporting data consistency on an active standby database after redirecting a DML statement to a primary database according to some embodiments of the invention.

Referring first to FIG. 2, the flowchart begins when a session 114*b* in the active standby server 100*b* receives (step 205) a DML statement 140 from a client 105*a*. Using the same example described above, suppose that the session 114*b* in the active standby server 100*b* receives (step 205) the following DML statement 140: "UPDATE Employees SET Salary=50000 WHERE Name='Bob';" As shown in FIG. 3A, upon receiving (step 205) the DML statement 140 at the session 114*b*, a unique transaction identifier ("Txn ID") is assigned to a transaction including the DML statement 140. This Txn ID is stored in association with session 114*b*. For illustrative purposes, FIG. 3A shows that Txn ID T1 is assigned to this transaction. However, in various embodiments, a Txn ID may have various parts (e.g., an undo segment number, an undo segment header transaction table slot, a sequence number, etc.). Furthermore, a Txn ID may be several bytes in length.

Figure 3B:
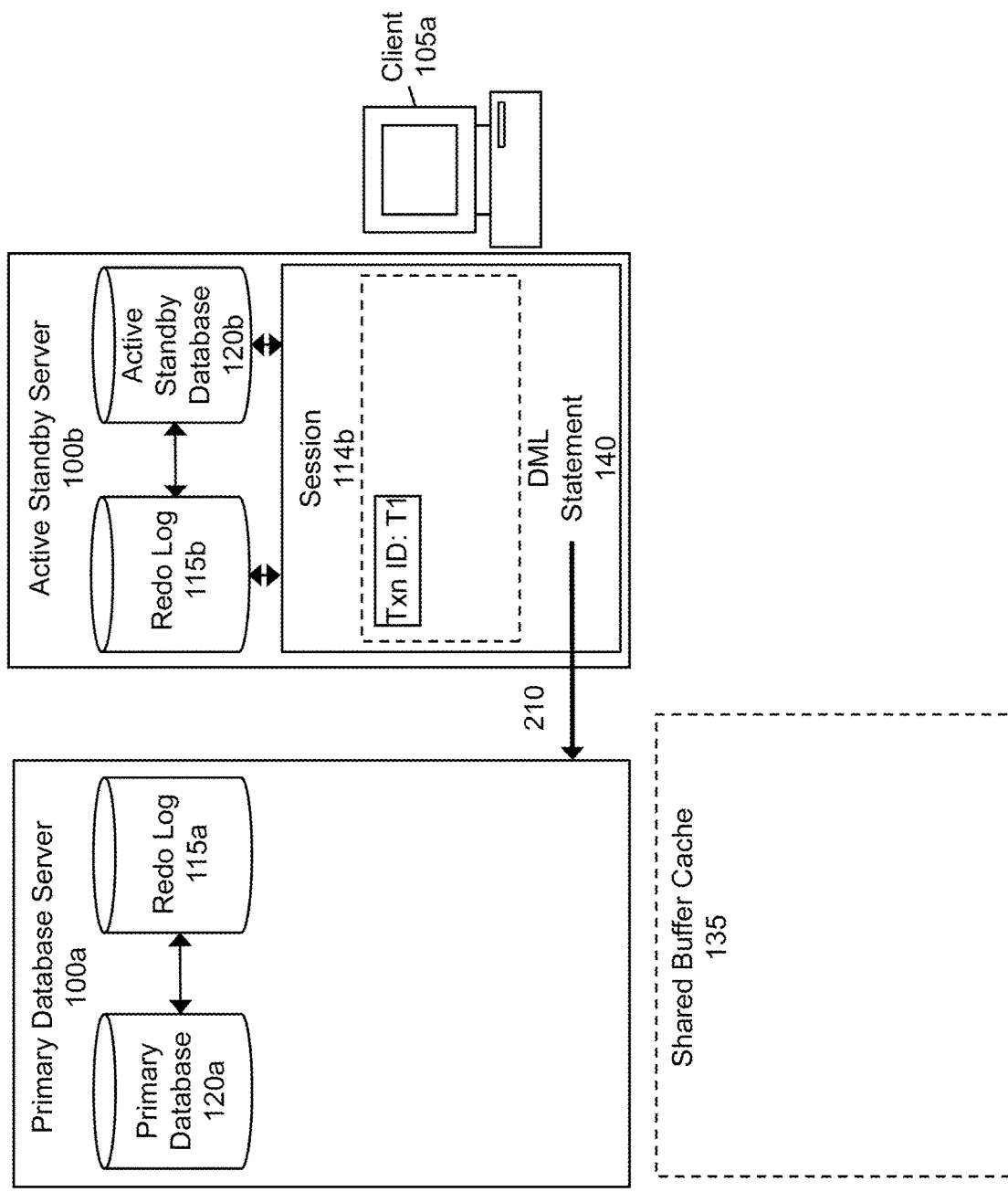

Referring back to FIG. 2, once the DML statement 140 has been received (step 205) at the session 114*b* in the active standby server 100*b*, since the active standby database 120*b* has read-only functionality, the active standby server 100*b* will redirect (step 210) the DML statement 140 to the primary database 120*a*. As shown in FIG. 3B, in some embodiments, the DML statement 140 may be redirected (step 210) to the primary database server 100*a* on which the primary database 120*a* resides. The DML statement 140 may be redirected (step 210) to the primary database 120*a* over a database link between the primary database server 100*a* and the active standby server 100*b*, as described above. Once the active standby server 100*b* has redirected (step 210) the DML statement 140 to the primary database 120*a*, the session 114*b* in the active standby server 100*b* is suspended.

In various embodiments, the DML statement 140 may be redirected (step 210) to the primary database 120*a* after a determination is made at the active standby server 100*b* that the statement received (step 205) at the session 114*b* is a DML statement 140. Although not illustrated in FIG. 3B, one or more components of the active standby server 100*b* may determine that a statement it receives (step 205) is a DML statement 140. For example, a compiler at the active standby server 100*b* may parse each statement it receives and determine whether it is a DML statement 140 based on the semantics of the statement. In this example, if a parsed statement includes the terms "INSERT," "UPDATE," "DELETE," "MERGE," etc., the compiler may determine that the statement is a DML statement 140. Continuing with this example, the active standby server 100b may then redirect (step 210) the DML statement 140 to the primary database 120a.

Figure 3C:
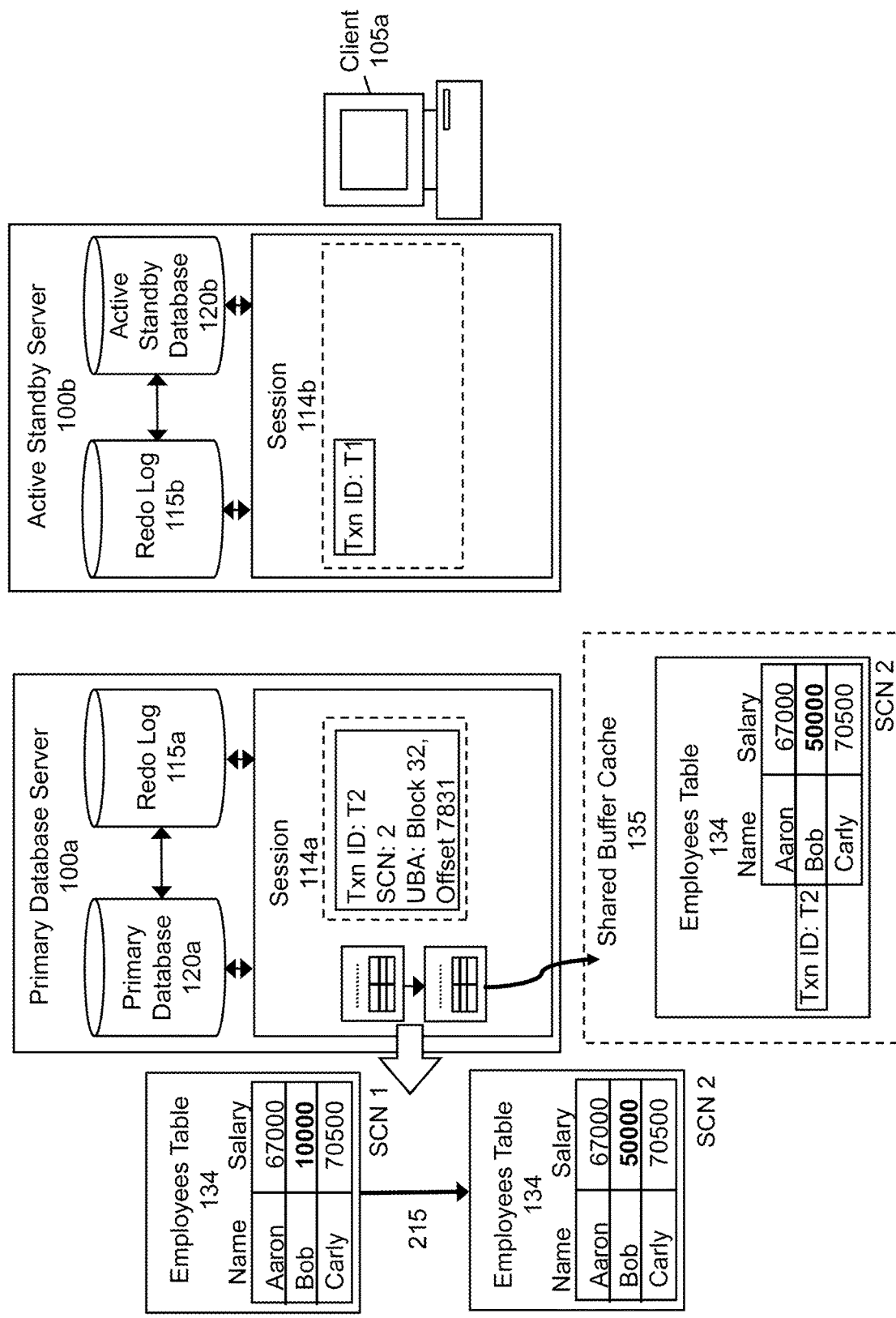

Referring again to FIG. 2, once the DML statement 140 has been redirected (step 210) to the primary database 120a, the DML statement 140 may be executed (step 215) on the primary database 120a. The DML statement 140 is executed (step 215) on the primary database 120a in a session 114a in the primary database server 100a. As shown in FIG. 3C, the primary database server 100a creates a session 114a upon receiving the DML statement 140 from the active standby server 100b. The DML statement 140 is then executed (step 215) on the primary database 120a in the session 114a in the primary database server 100a by updating the Employees table 134 such that the value of Bob's salary is changed from 10000 to 50000. Furthermore, upon execution of the DML statement 140, a unique Txn ID (Txn ID T2) is assigned to this transaction.

Referring still to FIG. 3C, the Employees table 134 is associated with different SCNs (System Change Numbers) prior to and following execution of the DML statement 140. SCNs occur in a monotonically increasing sequence and are used to order transactions that occur within a database 120. Each SCN indicates a logical point in time, such that a transaction having a lower SCN than another transaction occurred at an earlier time with respect to a database 120. In the example of FIG. 3C, the Employees table 134 in which Bob's salary is 10000 is associated with SCN 1 while the Employees table 134 in which Bob's salary has been updated to 50000 is associated with SCN 2, indicating that the transaction that made Bob's salary 10000 in the Employees table 134 occurred earlier than the transaction that made Bob's salary 50000 in the Employees table 134. For illustrative purposes, FIG. 3C shows SCNs corresponding to SCN 1 and SCN 2. However, in various embodiments, an SCN may have various parts (e.g., a wrap and a base). Furthermore, an SCN may be several bytes in length. In some embodiments, rather than using SCNs, each transaction may be associated with a different type of indicator that is used to order transactions (e.g., time stamps). In some embodiments, the current SCN may be stored in association with the current Txn ID in the session 114a in the primary database server 100a, as illustrated in FIG. 3C.

In some embodiments, the primary database 120a and the active standby database 120b may each have their own hardware memory structure. In some embodiments, a consistent set of data may be replicated and stored in these memory structures, such that the data stored in the memory structure of the primary database 120a and the active standby database 120b are consistent with each other. Furthermore, in some embodiments, the consistent set of data may be represented as a "shared buffer cache" 135, as shown in the example of FIG. 3C. In FIG. 3C, the updated Employees table 134 may be stored in a shared buffer cache 135, which stores one or more recently used data blocks. In some embodiments, data stored in the shared buffer cache 135 may be stored in association with information identifying one or more transactions that were responsible for changes made to the data. For example, since the change to the record corresponding to the value of Bob's salary is associated with Txn ID T2, and SCN 2, information indicating this association may be stored in the shared buffer cache 135 as well, as shown in FIG. 3C.

The redo log 115a at the primary database server 100a may be updated to include one or more redo/undo records that are generated upon execution of the DML statement 140 on the primary database 120a. For example, when the DML statement 140 is executed (step 215), a redo record is created that describes the type of change that was made, the location at which the change was made (e.g., block number and offset), the Txn ID and SCN associated with the change, etc. As described above, since each redo record stored in the redo log 115a may have a corresponding undo record, the redo log 115a may also be updated to include one or more corresponding undo records that describe how the changes made to the contents of the primary database 120a may be undone. As also described above, each undo record may describe how a change to a data block for a table may be undone and a location at which this information is located (i.e., an undo block address (UBA)).

In some embodiments, a subset of the information associated with execution of the DML statement 140 included in the redo/undo records may be stored in association with the session 114a in the primary database server 100a. In the example of FIG. 3C, Txn ID T2, SCN 2, and the UBA corresponding to block 32, at an offset of 7831 bytes are stored in association with the session 114a in the primary database server 100a. These three pieces of information may be used to identify uncommitted changes that were made by the DML statement 140 received (step 205) at the session 114b in the active standby server 100b. In embodiments in which this information is stored in association with the session 114a in the primary database server 100a, the information may be stored as non-persistent information (e.g., in an in-memory cache for the session 114a).

Figure 3D:
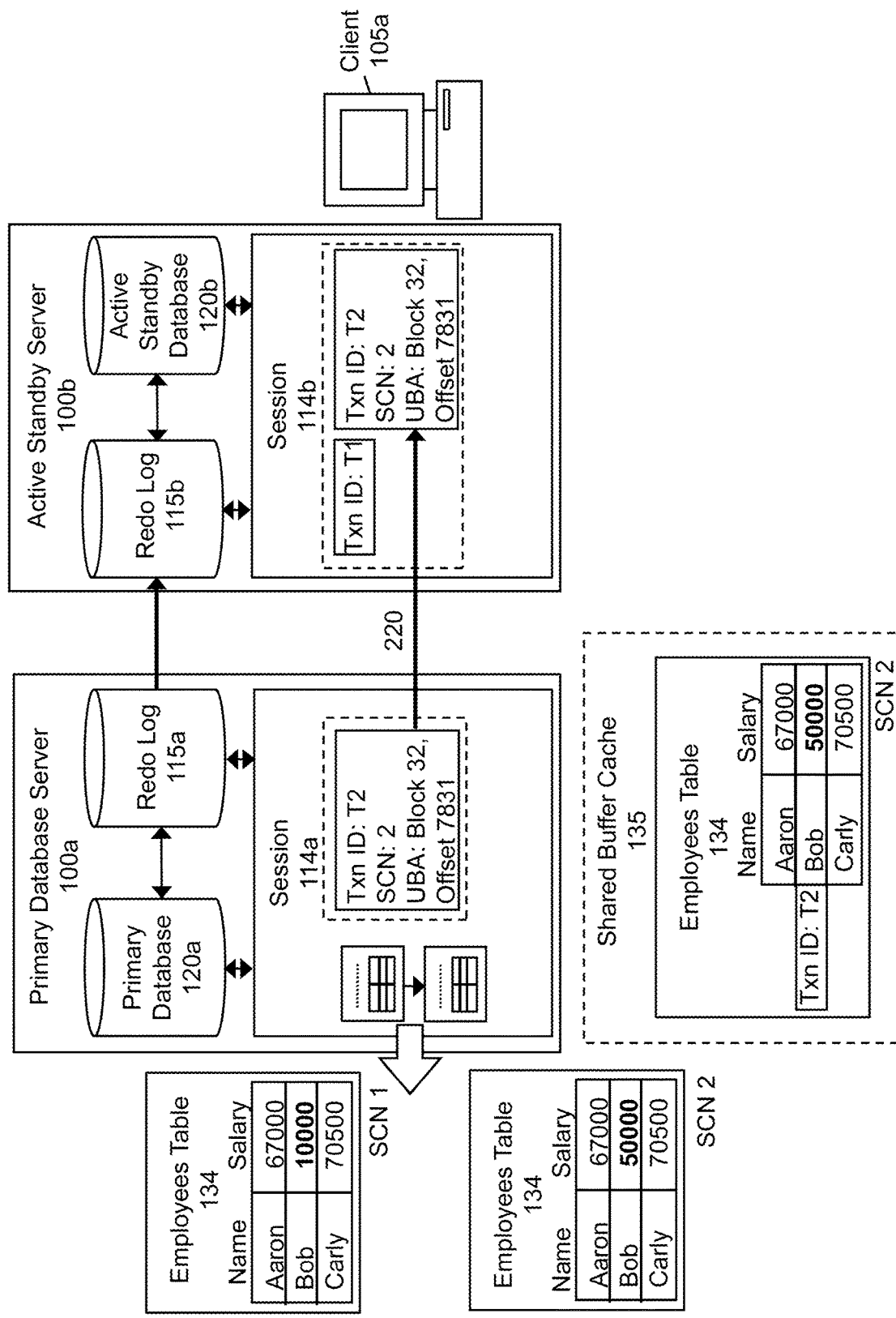

Referring again to FIG. 2, once the DML statement 140 has been executed (step 215) on the primary database 120a, the primary database server 100a may communicate (step 220) information associated with execution of the DML statement 140 to the session 114b in the active standby server 100b. As shown in FIG. 3D, this information, may include the Txn ID, the SCN, and the UBA. Furthermore, FIG. 3D also illustrates that this information may be communicated (step 220) separately from the redo/undo records sent by the primary database server 100a to the active standby server 100b to ensure the contents of the active standby database 120b are identical to the contents of the primary database 120a. In other embodiments, the information associated with execution of the DML statement 140 may be communicated (step 220) to the active standby server 100b as part of the redo/undo records that are sent to the active standby server 100b. The redo/undo records and/or the information associated with execution of the DML statement 140 may be communicated (step 220) to the active standby server 100b via a database link established between the active standby server 100b and the primary database server 100a (e.g., when the DML statement 140 was redirected (step 210) to the primary database server 100a), as described above.

Once received at the active standby server 100b, the information associated with execution of the DML statement 140 may be associated with the same session 114b in the active standby server 100b that received (step 205) the DML statement 140. For example, as shown in FIG. 3D, the session 114b in the active standby server 100b at which the DML statement 140 was received (step 205) is now associated with Txn ID 1 and Txn ID 2, as well as SCN 2 and the UBA of block 32, offset 7831. In some embodiments, this information is stored in association with the session 114b in the active standby server 100b (e.g., in an in-memory cache for the session 114b). Furthermore, once the redo/undo records are received at the active standby server 100b, the records may be stored in the redo log 115b at the active standby server 100b and changes described by the redo records may be applied to the active standby database 120*b*. Once the corresponding changes have been made to the active standby database 120*b*, control is returned to the database session 114*b* in the active standby server 100*b*.

Referring back to FIG. 2, the active standby server 100*b* may receive (step 225) a query 500 directed to the data that was updated by the DML, statement 140 prior to commitment of the transaction including the DML statement 140. In some embodiments, one or more components of the active standby server 100*b* may determine that a statement it receives is a query 500. For example, a compiler at the active standby server 100*b* may parse each statement it receives and determine whether it is a query 500 based on the semantics of the statement. In this example, if a parsed statement includes the term "SELECT," the compiler may determine that the statement is a query 500.

The query 500 may be executed (step 230) on the active standby database 120*b* based on whether information associated with the session 114 in the active standby server 100*b* at which the query 500 is received (step 225) matches information associated with execution of the DML statement 140. In some embodiments, the query 500 is executed (step 230) based on whether a Txn ID associated with the session 114 in the active standby server 100*b* that received (step 225) the query 500 matches a Txn ID associated with execution of the DML statement 140. In such embodiments, depending on whether the Txn ID matches, the query 500 may be executed (step 230) differently.

Figure 3E:
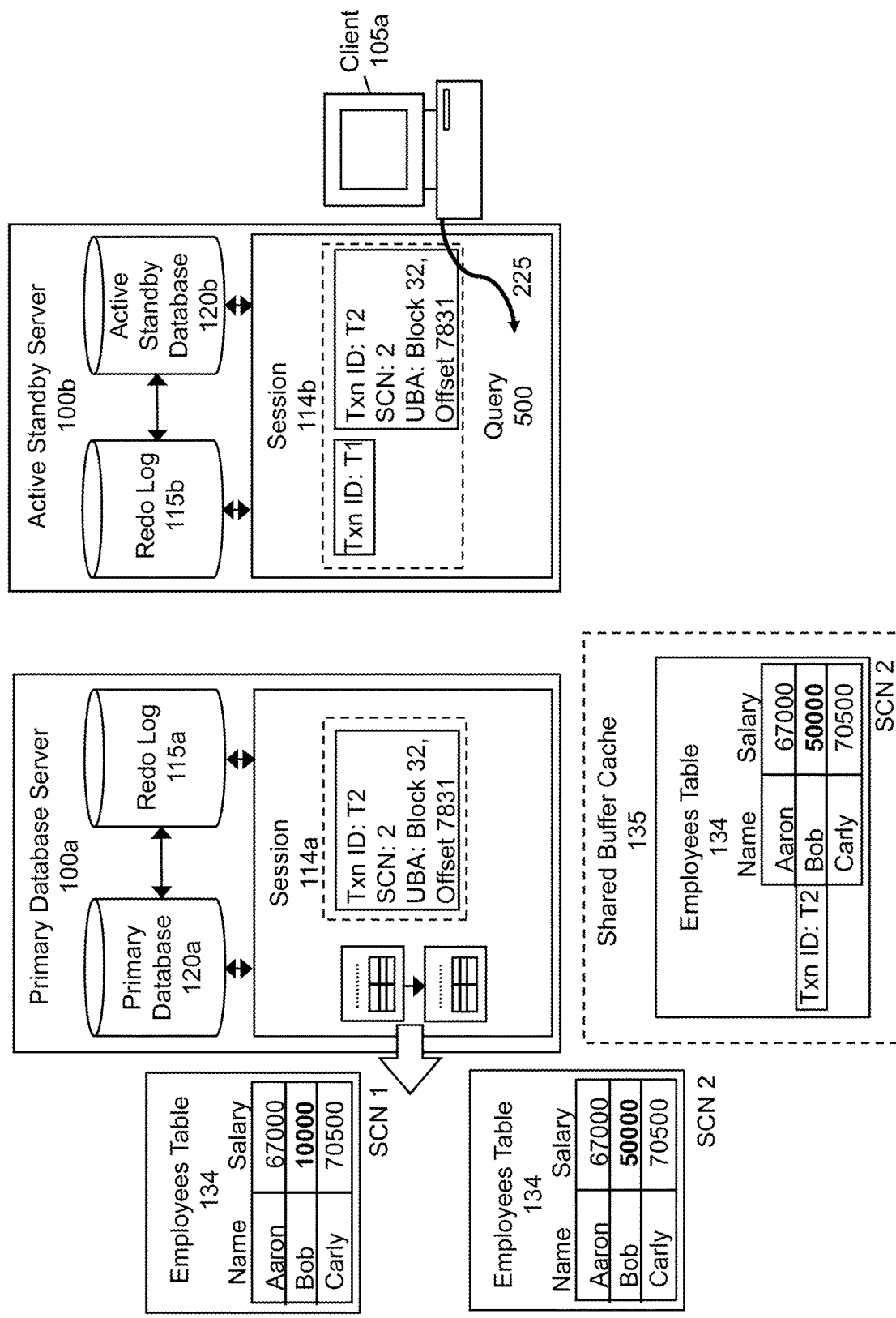
Figure 3F:
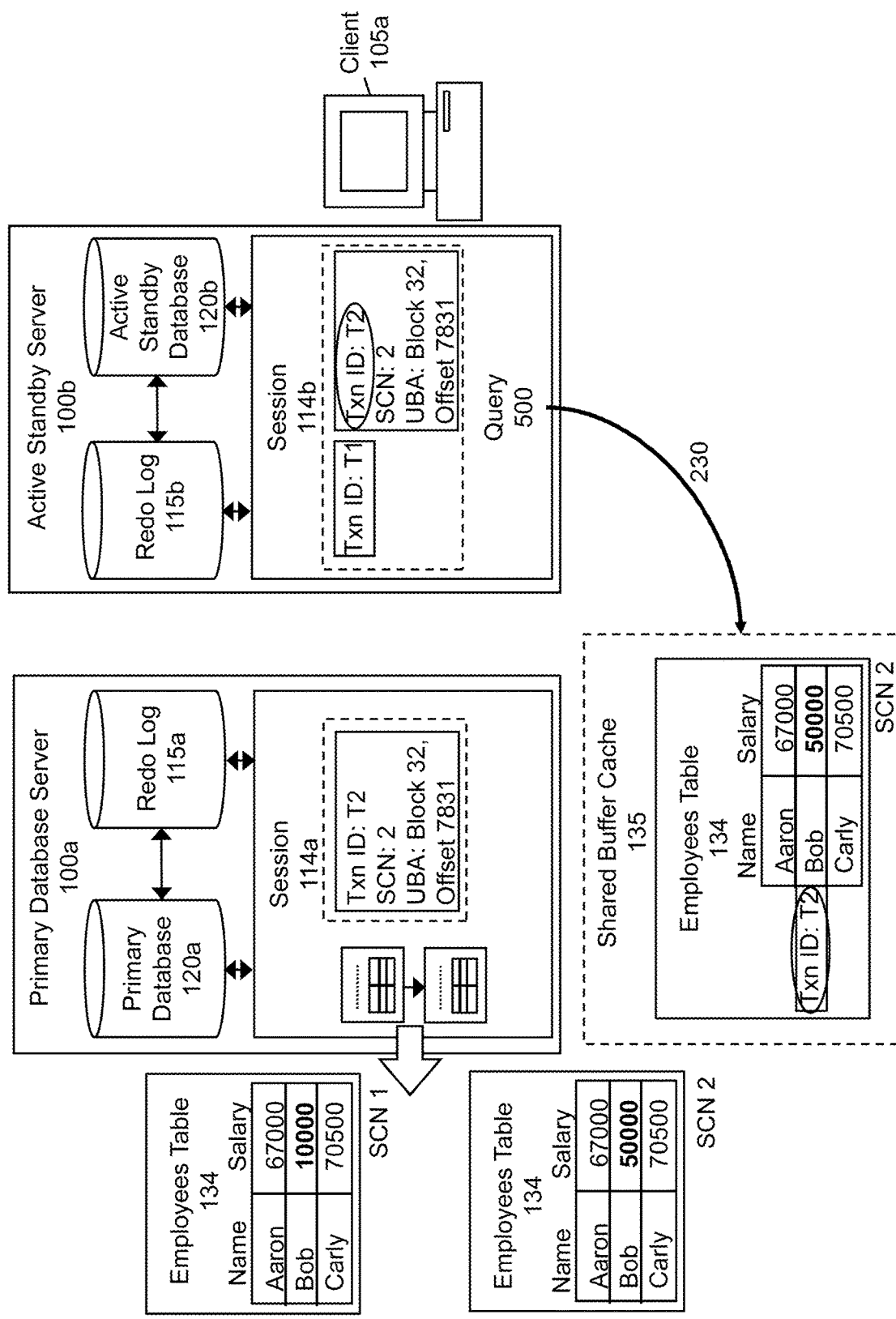
Figure 3G:
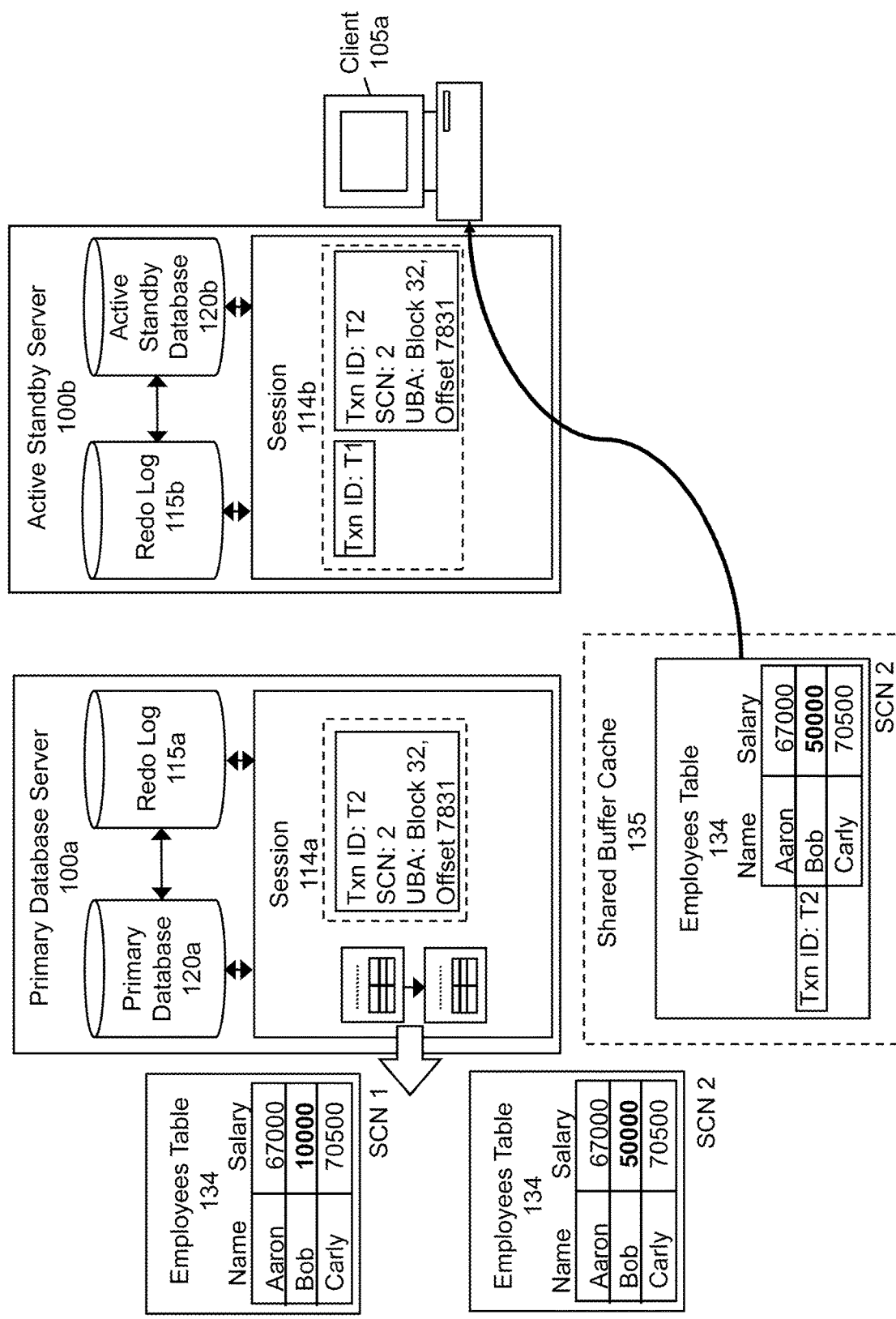

To illustrate an example in which the Txn ID associated with the session 114 in the active standby server 100*b* that received (step 225) the query 500 matches a Txn ID associated with execution of the DML statement 140, reference will now be made to FIGS. 3E-3G. In the example of FIG. 3E, suppose that the query 500 described in the example above ("SELECT*FROM Employees;") is received (step 225) at session 114*b* in the active standby server 100*b* from the client 105*a* prior to commitment of the transaction including the DML statement 140. As shown in FIG. 3F, the active standby server 100*b* accesses the shared buffer cache 135 to determine if data to which the query 500 is directed is stored there, since the shared buffer cache 135 includes data blocks that were most recently changed. Here, the active standby server 100*b* will find the Employees table 134 in which the salary for Bob was updated to 50000. To execute (step 230) the query 500, the active standby server 100*b* will determine whether the session 114*b* is associated with a Txn ID that matches a Txn ID associated with execution of the DML statement 140. Since the session 114*b* is associated with Txn ID T2, which matches the Txn ID associated with execution of the DML statement 140 (i.e., the update to Bob's salary), upon execution (step 230) of the query 500, the Employees table 134 stored in the shared buffer cache 135 is returned to the client 105*a* via session 114*b*, as shown in FIG. 3G.

Figure 3H:
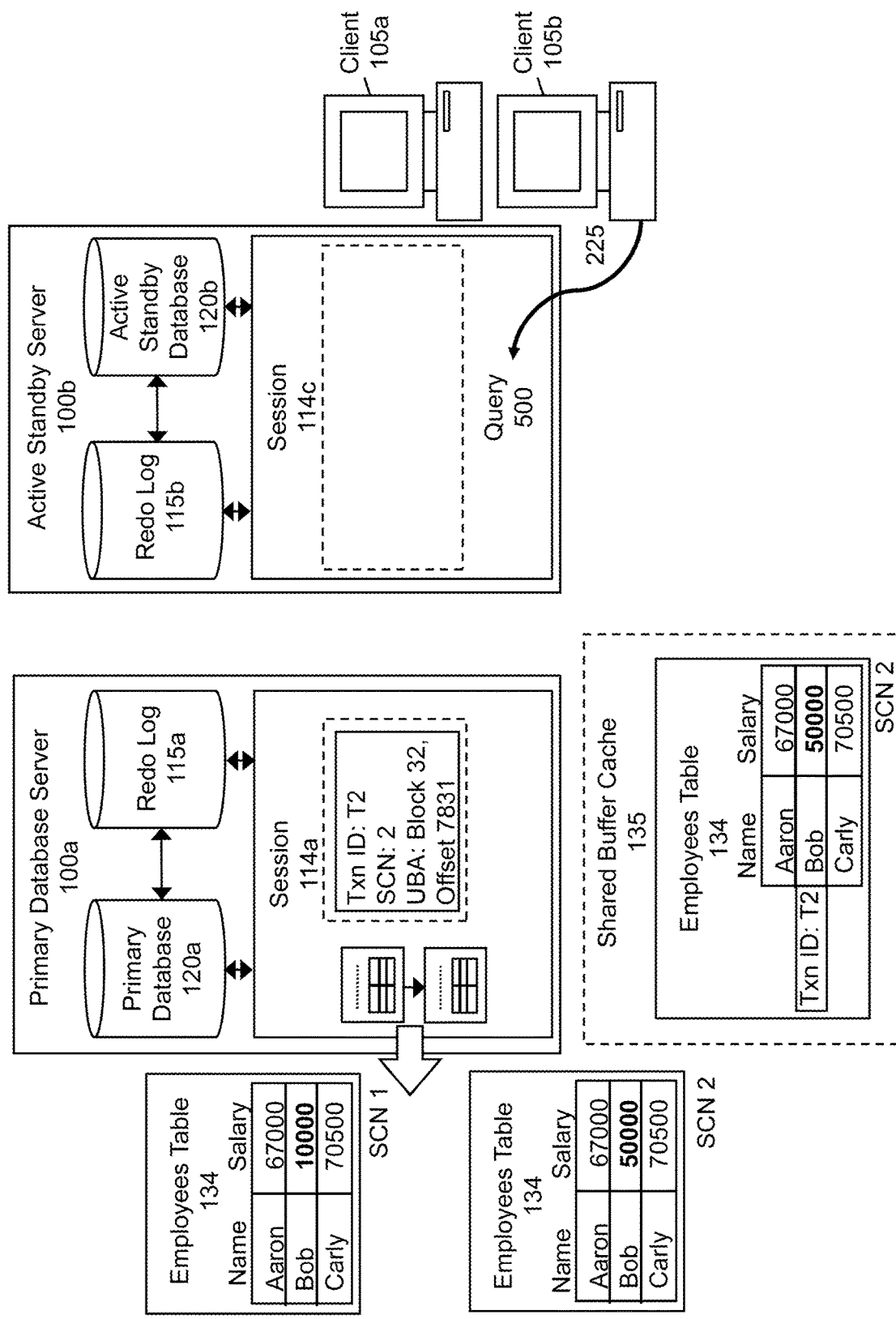
Figure 3I:
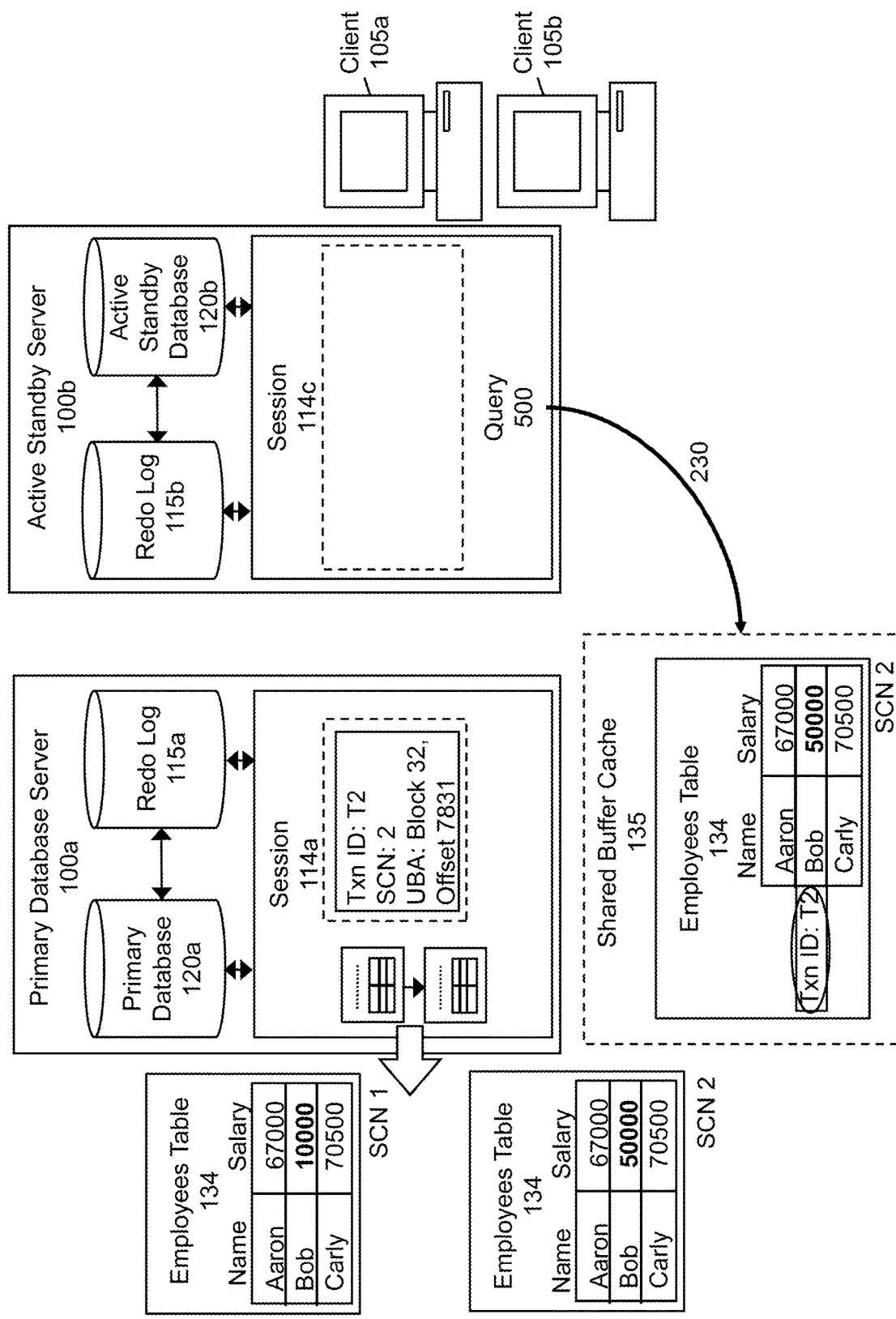
Figure 3J:
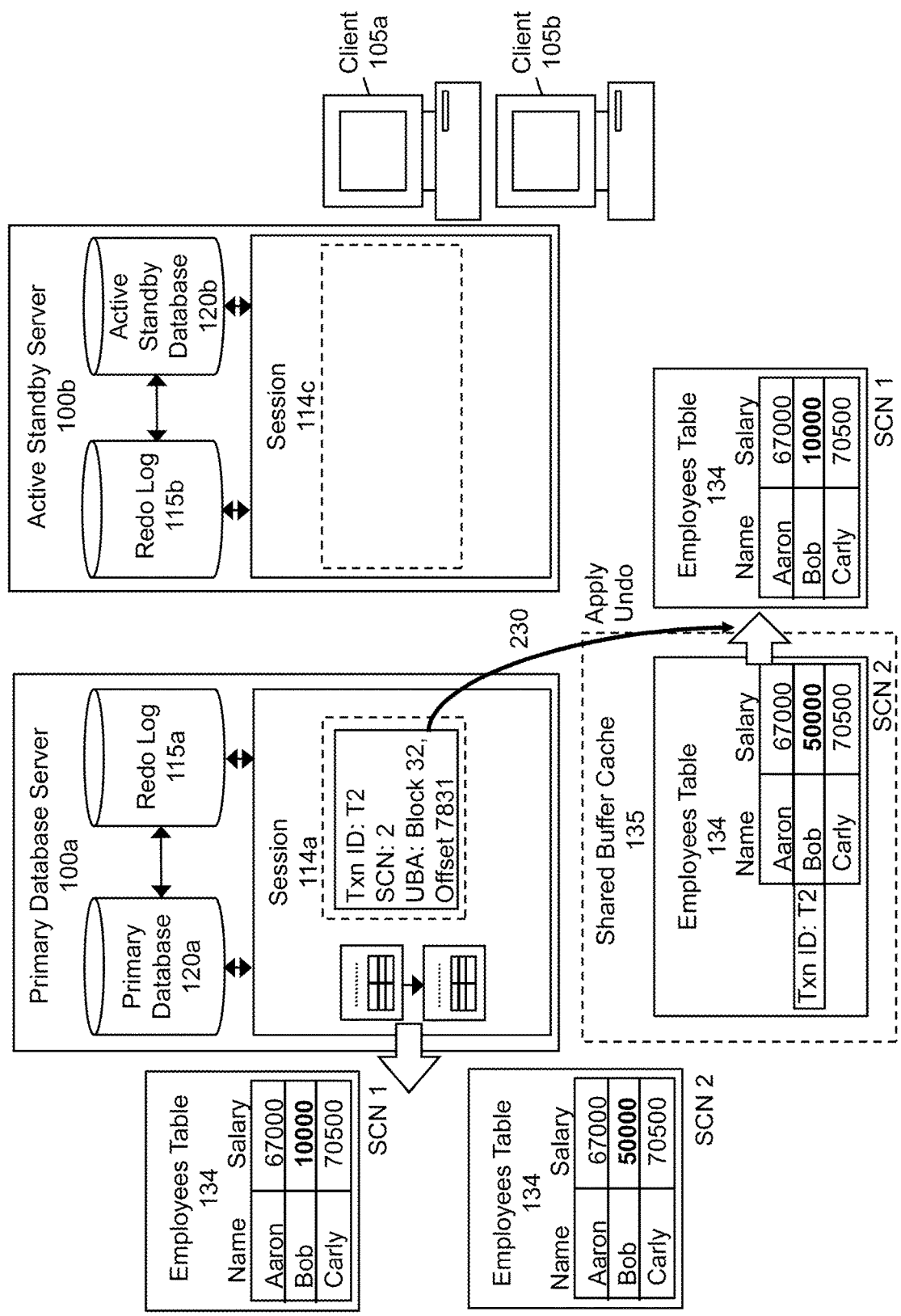

In contrast, to illustrate an example in which the Txn ID associated with the session 114 in the active standby server 100*b* that received (step 225) the query 500 does not match a Txn ID associated with execution of the DML statement 140, reference will now be made to FIGS. 3H-3K. In the example of FIG. 3H, suppose that the query 500 described in the example above ("SELECT*FROM Employees;") is received (step 225) at a session 114*c* in the active standby server 100*b* different from the session 114*b* at which the DML statement 140 was received (step 205) and which is associated with a client 105*b* different than the client 105*a* from which the DML statement 140 was received (step 205). Similar to above, the shared buffer cache 135 is accessed by the active standby server 100*b* to determine if data to which the query 500 is directed is stored there, as shown in FIG. 3I. To execute (step 230) the query 500, the active standby server 100*b* will determine whether the session 114*c* is associated with a Txn ID that matches a Txn ID associated with execution of the DML statement 140. Since session 114*c* is not associated with Txn ID T2, the session 114*c* is not associated with a Txn ID that matches the Txn ID associated with execution of the DML statement 140 (i.e., the update to Bob's salary). Therefore, as shown in FIG. 3J, during execution (step 230) of the query 500, the Employees table 134 stored in the shared buffer cache 135 is "rolled back" by applying the undo record identified by the UBA associated with the Txn ID T2 to obtain the Employees table 134 associated with an earlier SCN (i.e., SCN 1). Then, as shown in FIG. 3K, the rolled back Employees table 134 is returned to the client 105*b* via session 114*c*.

Figure 3K:
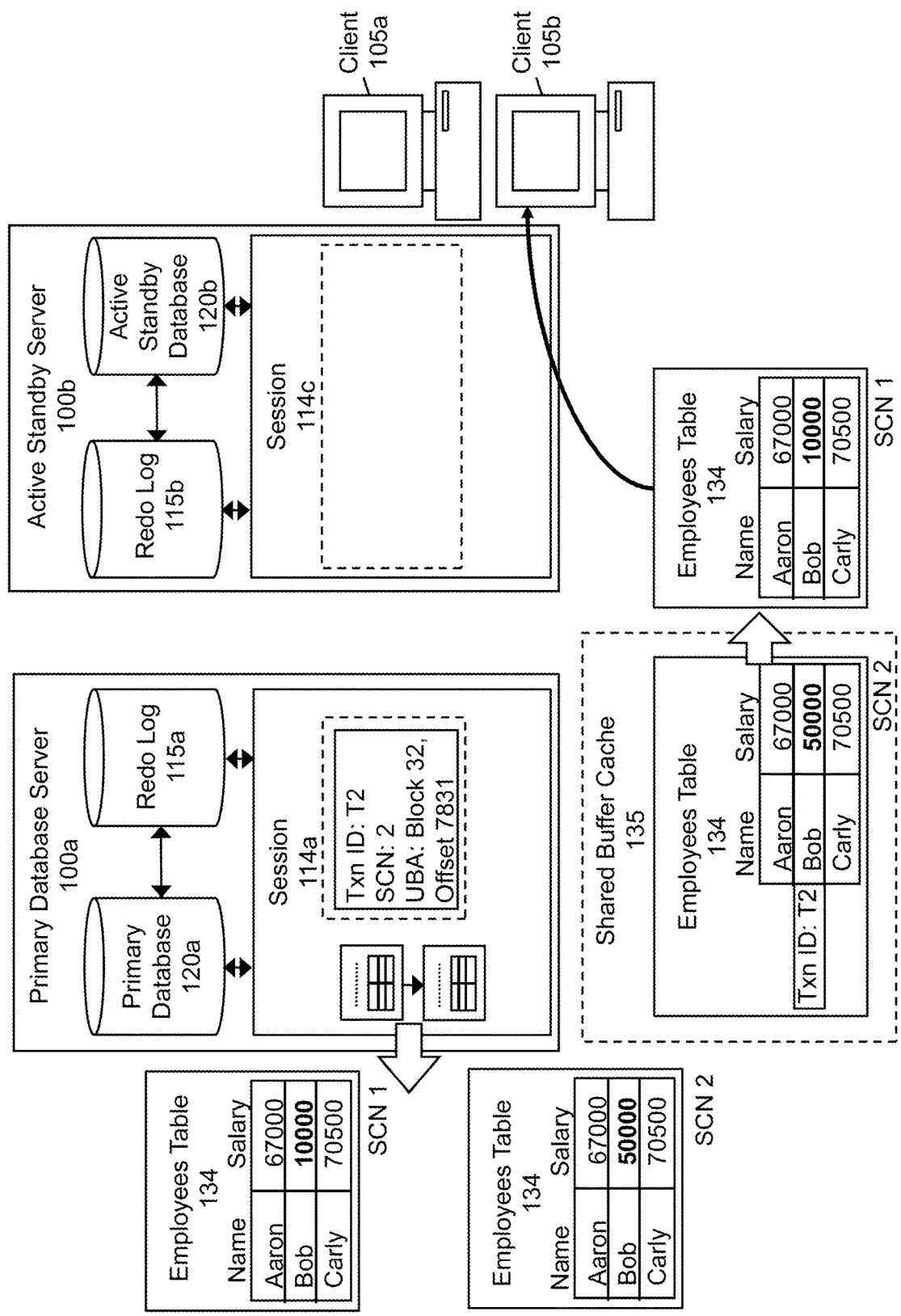

Although not depicted in FIG. 3K, in some embodiments, multiple undo records may be applied to data in the shared buffer cache 135 before the data is returned to the client 105*b*. For example, after rolling back the Employees table 134 stored in the shared buffer cache 135 to obtain the Employees table 134 associated with SCN 1, a record in the rolled back Employees table 134 may still include a record associated with a Txn ID (e.g., Txn ID 0) associated with an uncommitted transaction that is not associated with session 114*c*. In this case, multiple undo records may have to be applied to the Employees table 134 in the shared buffer cache 135. For example, a chain of undo records may have to be applied until the Employees table 134 that is obtained includes only committed changes and/or changes that are associated with Txn IDs that match Txn IDs associated with the session 114*c* at which the query 500 was received (step 225). Thus, data consistency is preserved for queries 500 directed to data that was changed within the same database session 114.

Figure 4:
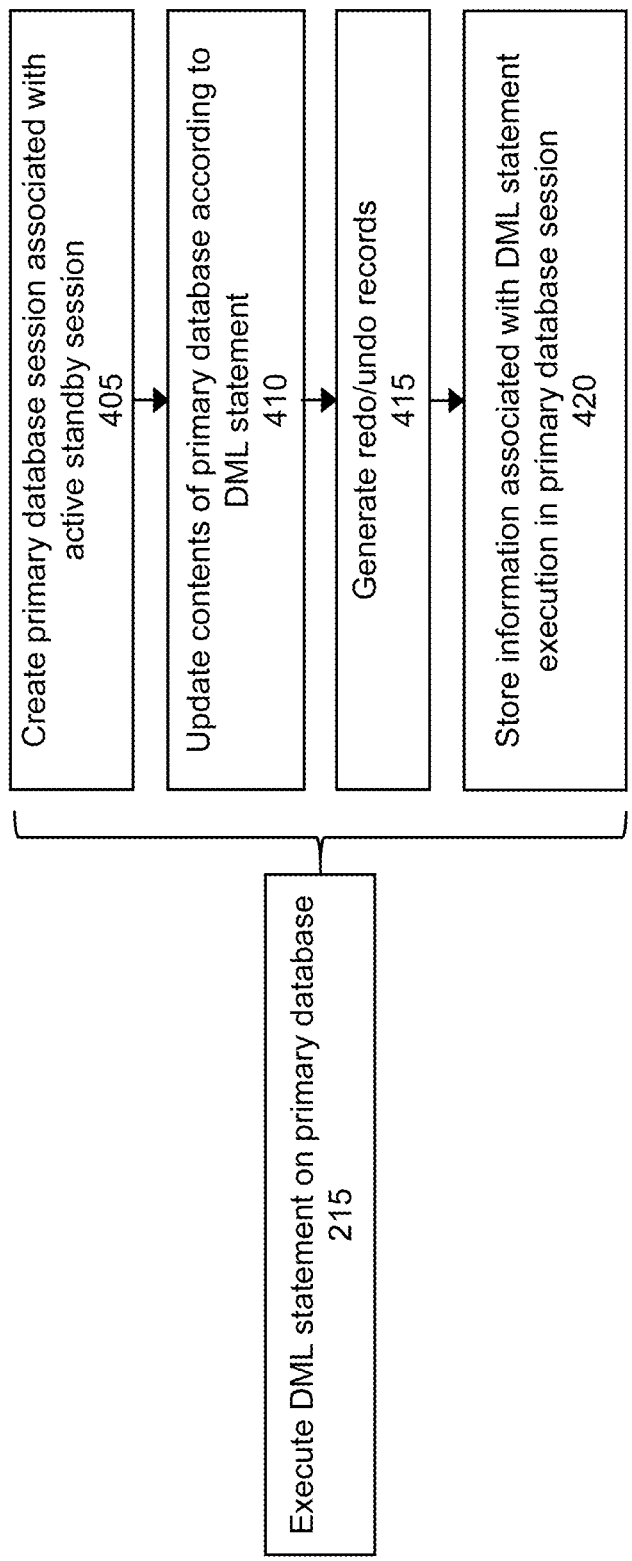
FIG. 4 is a flow chart for executing a DML statement on a primary database according to some embodiments of the invention.

FIG. 4 is a flow chart for executing a DML statement on a primary database according to some embodiments of the invention. Some of the steps illustrated in the flowchart are optional in different embodiments. In some embodiments, the steps may be performed in an order different from that described in FIG. 4. Some of the steps of FIG. 4 are discussed below in conjunction with FIGS. 5A-5E, which illustrate an example of executing a DML statement on a primary database according to some embodiments of the invention.

Figure 5A:
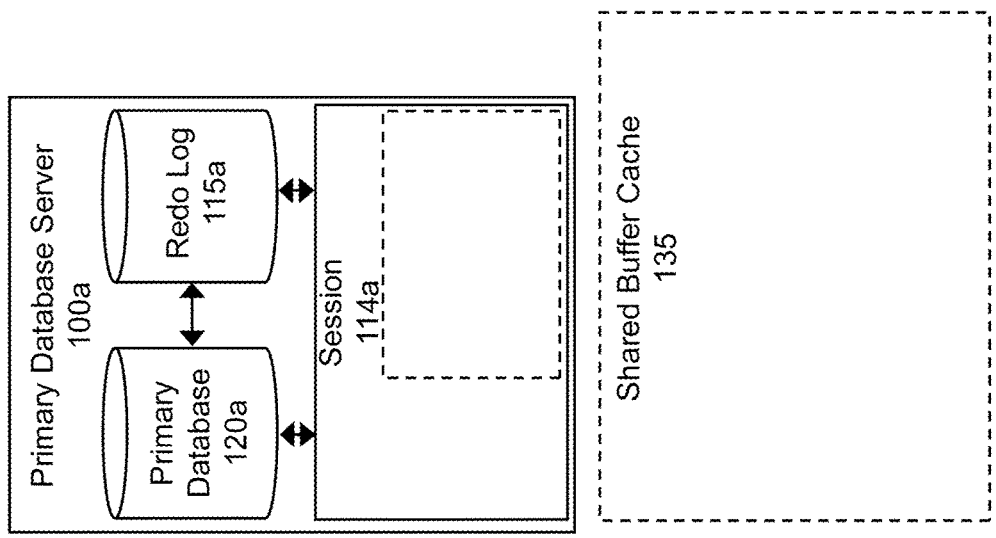
FIGS. 5A-5E illustrate an example of executing a DML statement on a primary database according to some embodiments of the invention.

Referring first to FIG. 4, execution of the DML statement 140 on the primary database 120*a* begins when a session 114*a* is created (step 405) in the primary database server 100*a*. As described above, the session 114*a* is created (step 405) in the primary database server 100*a* upon receiving the DML statement 140 at the primary database server 100*a* that was redirected (step 210) from the active standby server 100*b*. This session 114*a* is associated with the session 114*b* in the active standby server 100*b* at which the DML statement 140 was received (step 205). FIG. 5A illustrates this session 114*a* in the primary database server 100*a*.

Figure 5B:
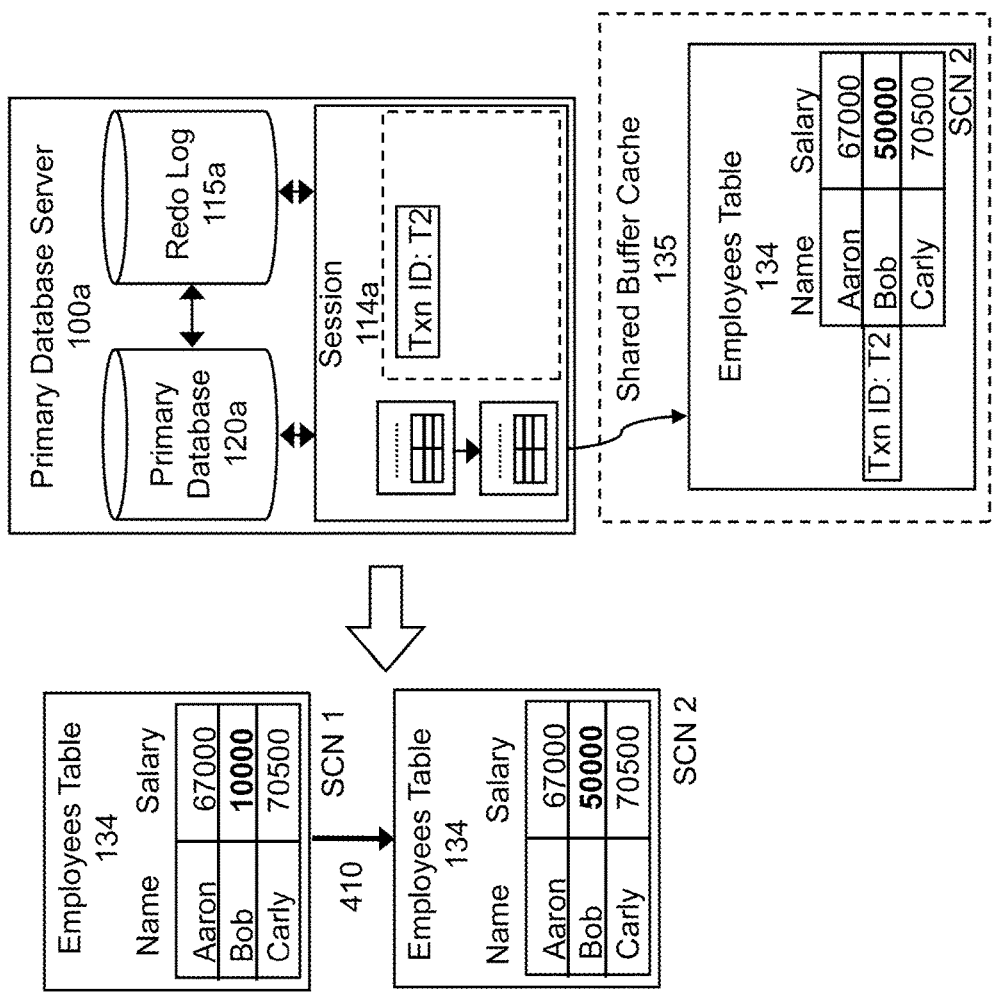

Referring back to FIG. 4, the contents of the primary database 120*a* may then be updated (step 410) according to the DML statement 140. When the contents are updated (step 410), a unique Txn ID is assigned to a transaction including the DML statement 140. As shown in FIG. 5B, Txn ID T2 is assigned to this transaction, which involves updating (step 410) the Employees table 134 such that Bob's salary is changed from 10000 to 50000. As also described above, since each transaction is associated with an SCN, the Employees table 134 in which Bob's salary is 10000 is associated with SCN 1 while the Employees table 134 in which Bob's salary has been updated (step 410) to 50000 is associated with SCN 2. Furthermore, the updated Employees table 134 may be stored in association with its Txn ID and SCN in the shared buffer cache 135, such that the Employees table 134 is associated with SCN 2 and the updated record is associated with Txn ID T2.

Figure 5C:
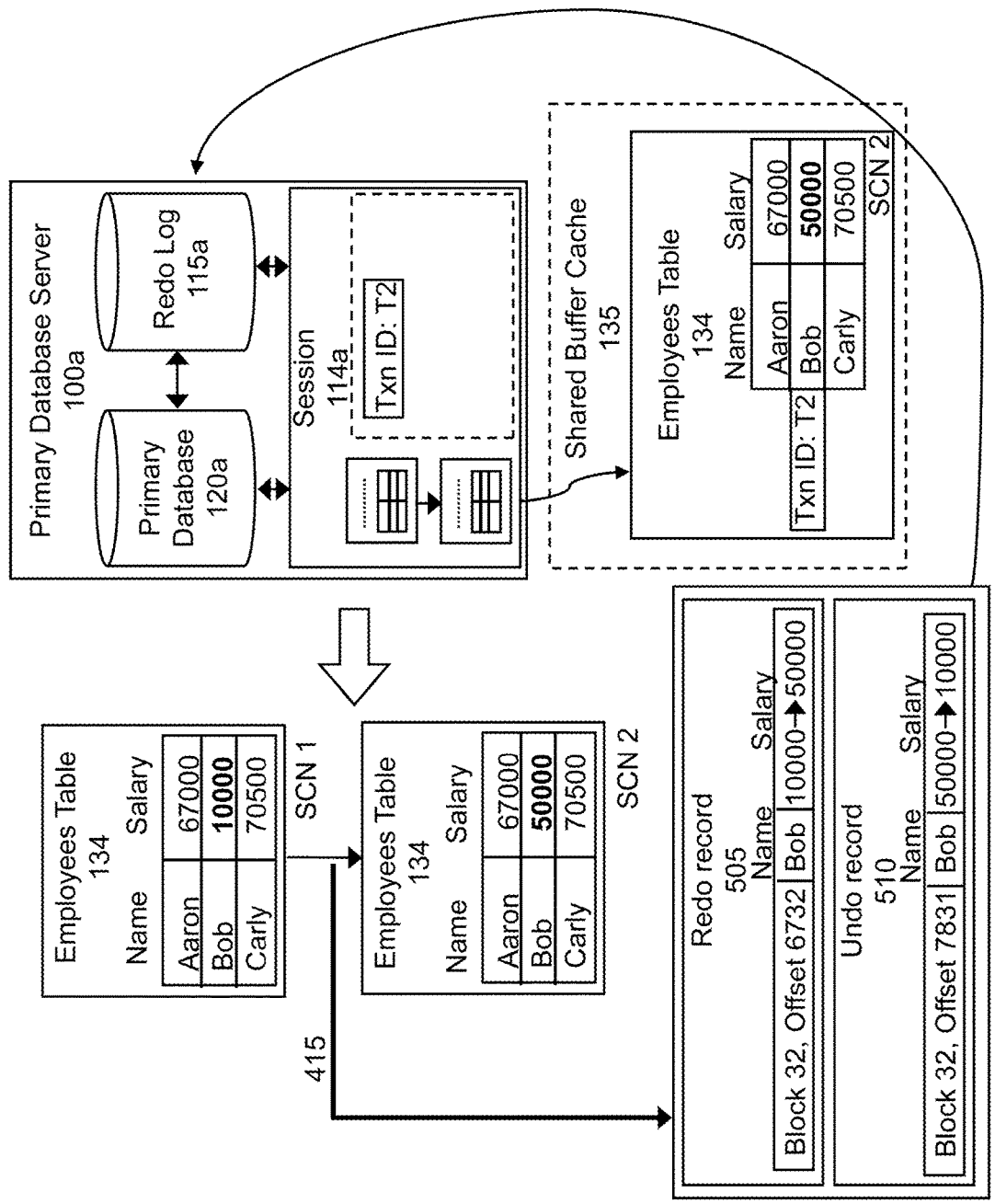

As shown in FIG. 4, after the contents of the primary database 120*a* have been updated (step 410), one or more redo/undo records describing the updates/how to undo the updates may be generated (step 415). These records may be stored in the redo log 115*a* at the primary database server 100*a*. For example, as shown in FIG. 5C, a redo record 505 describing the update to the Employees table 134 and an undo record 510 describing how to undo the update to the Employees table 134 are generated (step 415). The redo record 505 describes how the salary for Bob was changed from 10000 to 50000 and the location at which this information is located (i.e., block 32, offset 6732). The undo record 510 describes how the change to the salary for Bob may be undone from 50000 to 10000 and the location at which this information is located (i.e., block 32, offset 7831). For illustrative purposes, the redo record 505 and the undo record 510 shown in FIG. 5C each describe a single change. However, in various embodiments, redo records 505 and/or undo records 510 may describe more changes than depicted in FIG. 5C (e.g., multiple change vectors for an atomic change).

Figure 5D:
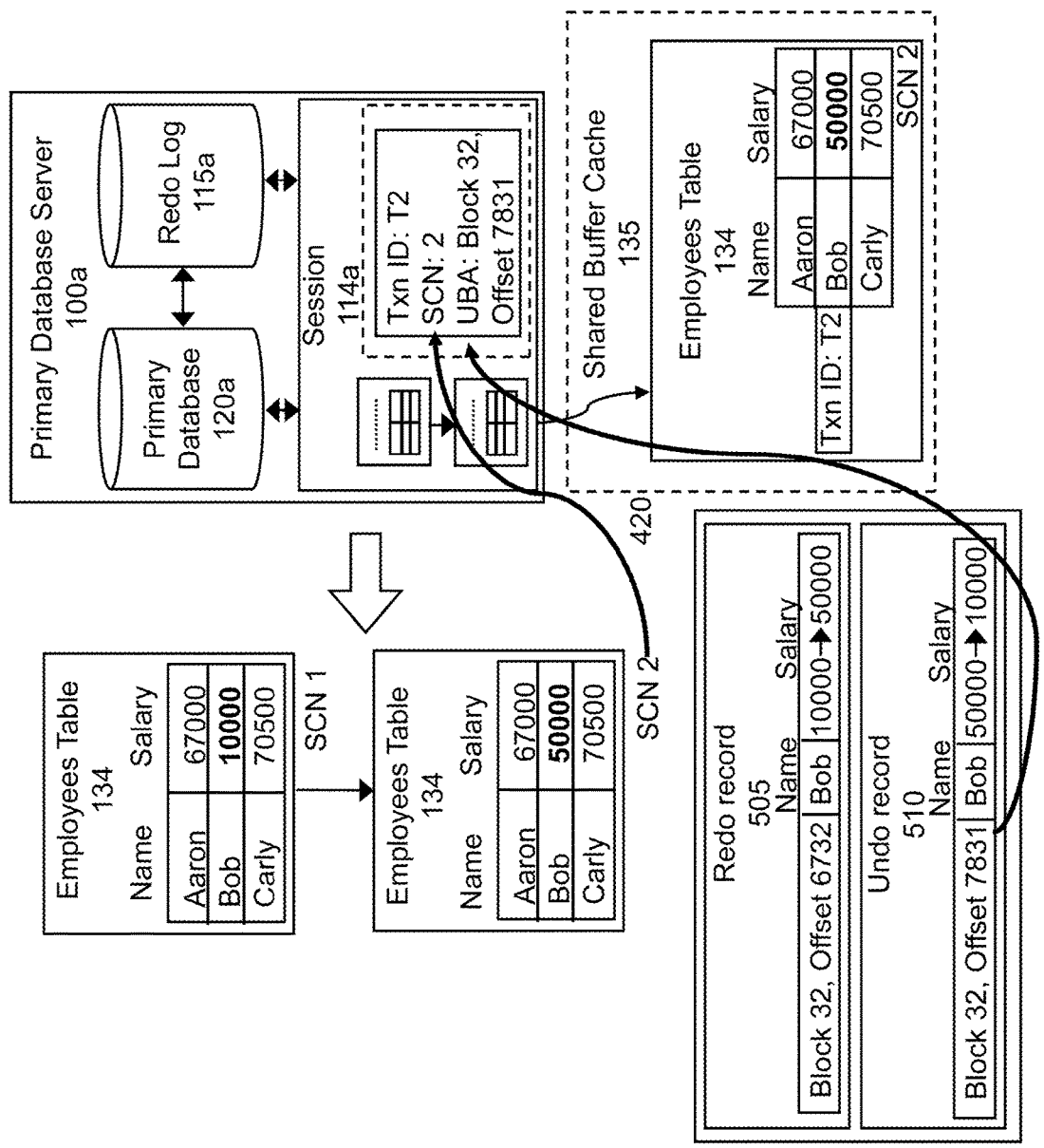
Figure 5E:
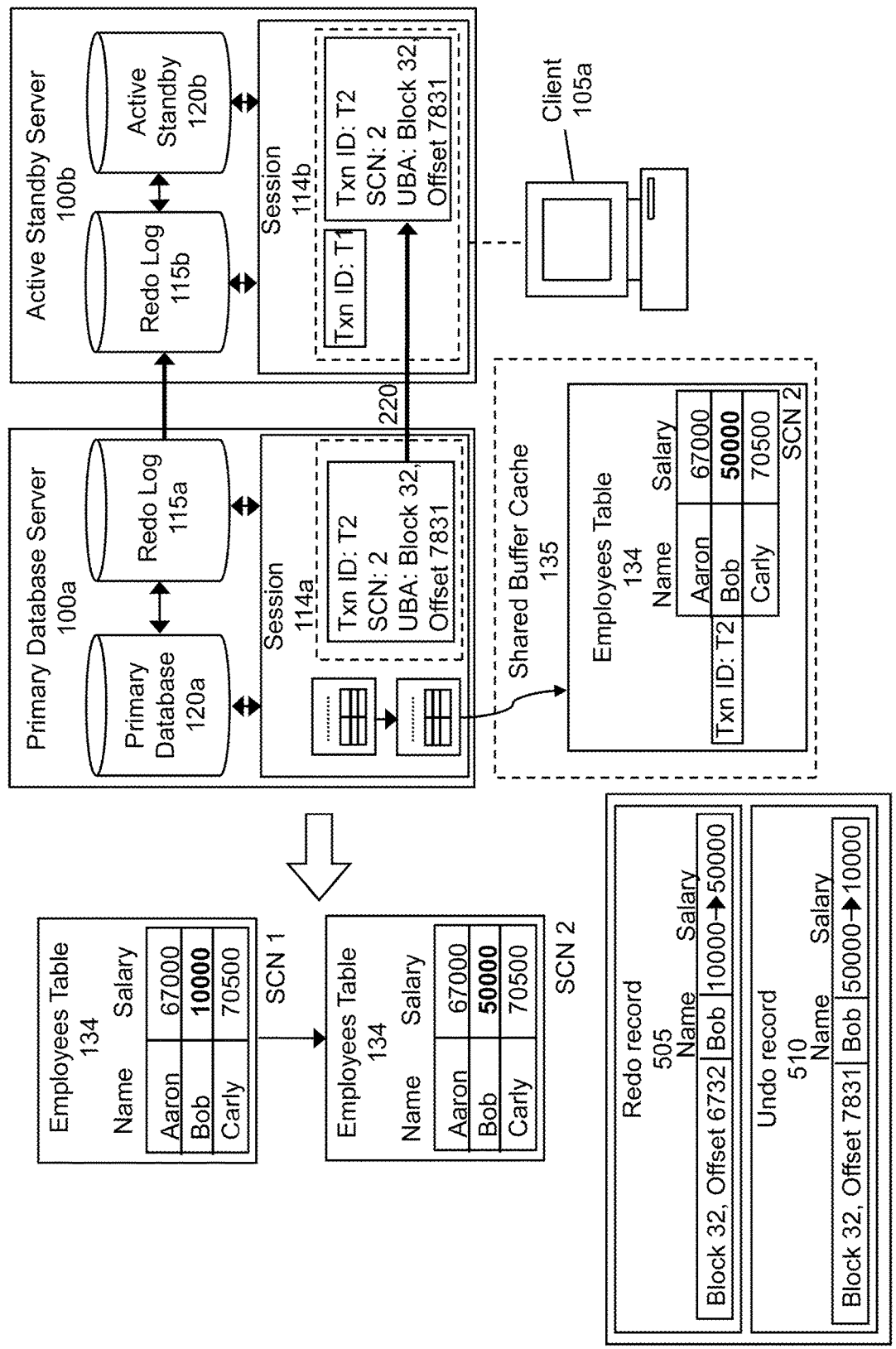

Referring once more to FIG. 4, execution of the DML, statement 140 on the primary database 120*a* is complete when information associated with execution of the DML statement 140 is stored (step 420) in the session 114*a* in the primary database server 100*a*. For example, as shown in FIG. 5D, SCN 2 and the UBA of block 32, offset 7831 are both stored in association with Txn ID T2 in the session 114*a*. As mentioned above, in some embodiments, the information associated with execution of the DML statement 140 is stored (step 420) as non-persistent information (e.g., in an in-memory cache for the session 114*a*). Once execution of the DML statement 140 is complete, the information associated with execution of the DML statement 140 may be communicated (step 220) to the session 114*b* in the active standby server 100*b* at which the DML statement 140 was received (step 205), as shown in FIG. 5E.

Figure 6:
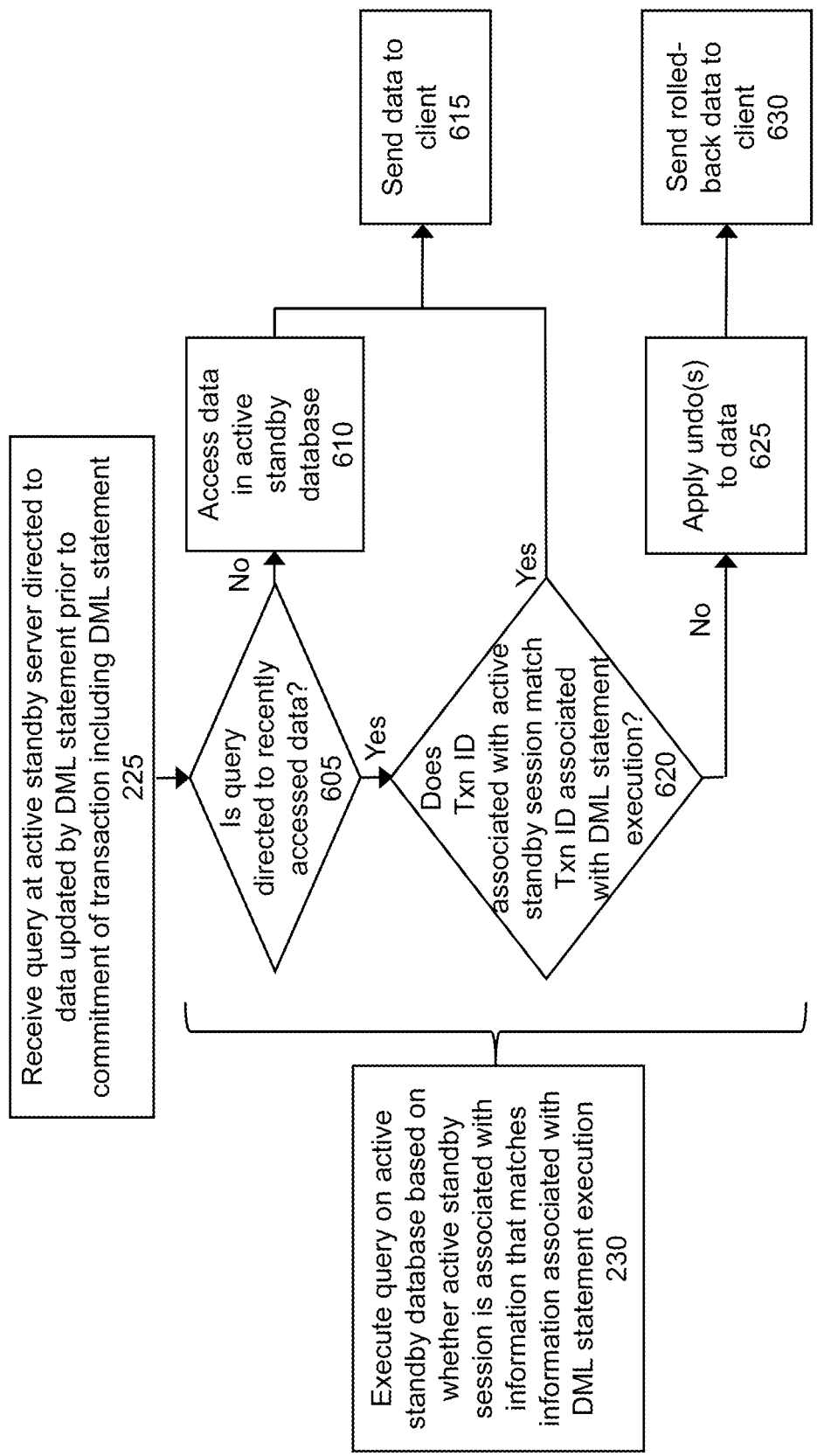
FIG. 6 is a flow chart for executing a query on an active standby database based on whether information associated with a database session in a server on which the active standby database resides matches information associated with execution of a DML statement according to some embodiments of the invention.

FIG. 6 is a flow chart for executing a query on an active standby database based on whether information associated with a database session in a server on which the active standby database resides matches information associated with execution of a DML statement according to some embodiments of the invention. Some of the steps illustrated in the flowchart are optional in different embodiments. In some embodiments, the steps may be performed in an order different from that described in FIG. 6. Some of the steps of FIG. 6 are discussed below in conjunction with FIGS. 7A-7H, which illustrate an example of executing a query on an active standby database based on whether information associated with a database session in a server on which the active standby database resides matches information associated with execution of a DML statement according to some embodiments of the invention.

Referring first to FIG. 6, after the session 114 in the active standby server 100*b* receives (step 225) the query 500 directed to data updated by the DML statement 140 prior to commitment of the transaction including the DML statement 140, the query 500 may be executed (step 230) on the active standby database 120*b* based on whether the session 114 is associated with information that matches information associated with execution of the DML statement 140. To execute (step 230) the query 500, in some embodiments, the active standby server 100*b* may first determine (step 605) if the query 500 is directed to data that was recently accessed. For example, the active standby server 100*b* may access the shared buffer cache 135 and determine if the data to which the query 500 is directed is stored there. If the data is not in the shared buffer cache 135, the active standby server 100*b* may determine (step 605) that the query 500 is not directed to recently accessed data and access (step 610) the data to which the query 500 is directed from disk. In alternative embodiments, the active standby server 100*b* may access (step 610) the data to which the query 500 is directed in the primary database 120*a* (e.g., via a database link between the primary database server 100*a* and the active standby server 100*b*). Once the active standby server 100*b* has accessed (step 610) the data to which the query 500 is directed in the primary database 120*a* or in the active standby database 120*b*, the data may be sent (step 615) to the client 105 from which the query 500 was received (step 225) via the session 114 in the active standby server 100*b* at which the query 500 was received (step 225).

Figure 7A:
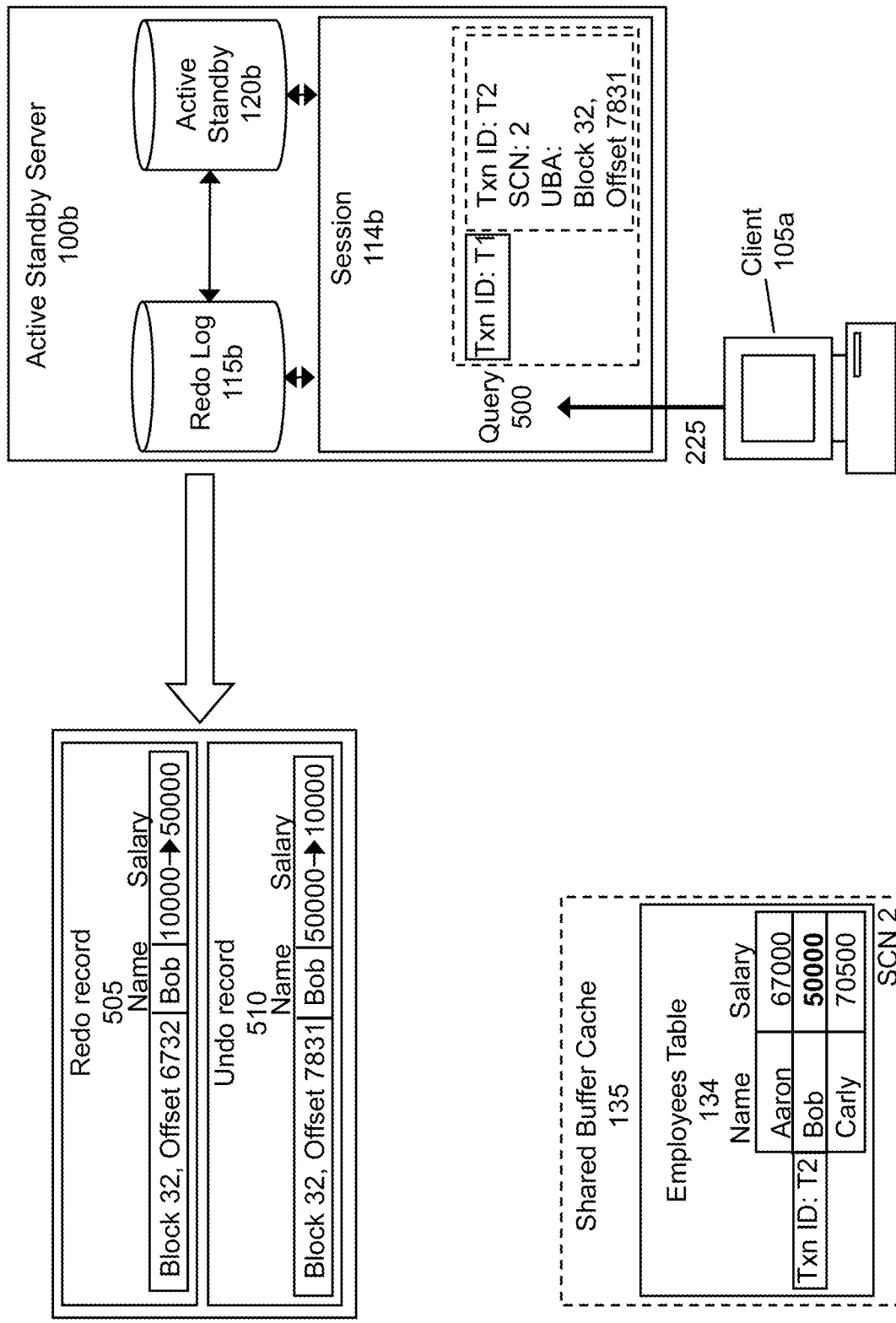
FIGS. 7A-7H illustrate an example of executing a query on an active standby database based on whether information associated with a database session in a server on which the active standby database resides matches information associated with execution of a DML statement according to some embodiments of the invention.
Figure 7B:
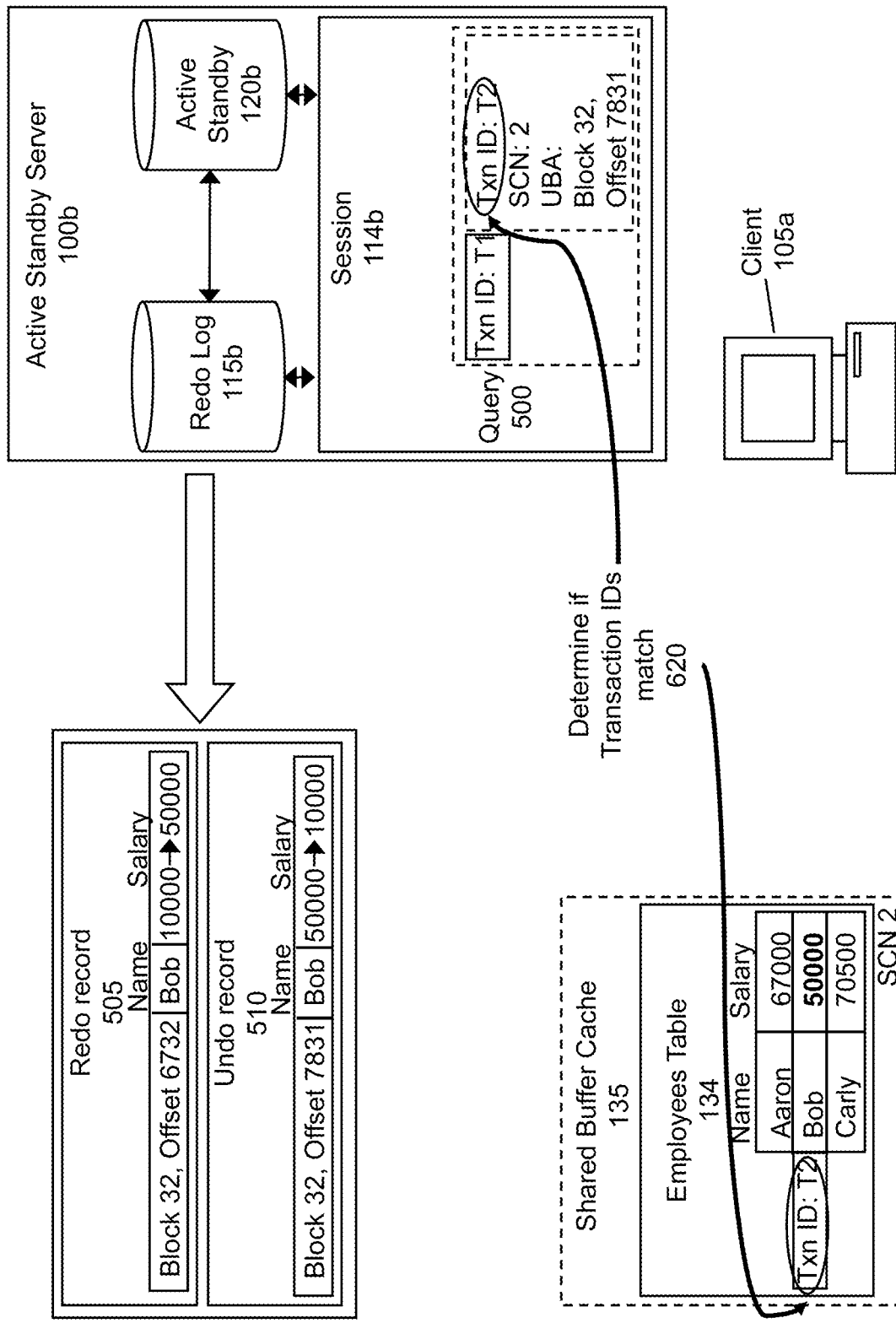

In step 605 described above, if the data to which the query 500 is directed is in the shared buffer cache 135, the active standby server 100*b* may determine (step 605) that the query 500 is directed to recently accessed data and proceed to determine (step 620) if a Txn ID associated with the session 114 in the active standby server 100*b* at which the query 500 was received (step 225) matches a Txn ID associated with execution of the DML statement 140. As shown in the example of FIG. 7A, the session 114*b* in the active standby server 100*b* at which a query 500 ("SELECT*FROM Employees;") is received (step 225) may be associated with two Txn IDs: Txn ID T1 and Txn ID T2. Assuming that the query 500 is received (step 225) not long after the record corresponding to Bob's salary in the Employees table 134 was updated from 10000 to 50000, the Employees table 134 is stored in the shared buffer cache 135 in conjunction with information indicating that the transaction that updated this data is associated with Txn ID T2 and SCN 2. As shown in FIG. 7B, since the query 500 is directed to the Employees table 134 and the Txn ID associated with the update to the Employees table 134 is T2, the active standby server 100*b* may determine (step 620) that the Txn ID associated with execution of the DML statement 140 (i.e., the Txn ID associated with the record for Bob in the Employees table 134) matches the Txn ID associated with the session 114*b* at which the query 500 was received (step 225).

Figure 7C:
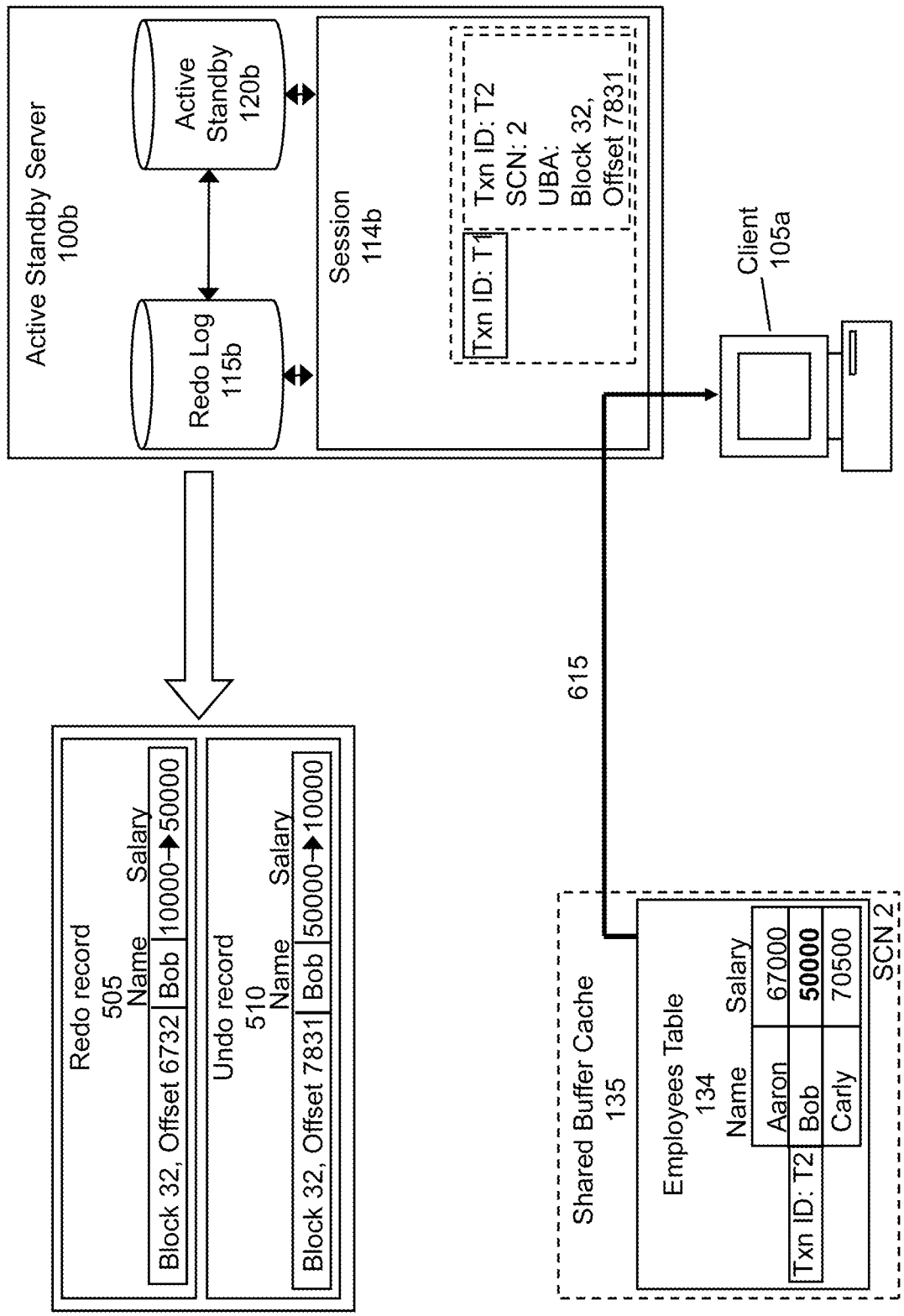

As shown in FIG. 6, if the active standby server 100*b* determines (step 620) that a Txn ID associated with the session 114 in the active standby server 100*b* at which the query 500 was received (step 225) matches a Txn ID associated with execution of the DML statement 140, the data in the shared buffer cache 135 may be sent (step 615) to the client 105 from which the query 500 was received (step 225) via the session 114 in the active standby server 100*b* at which the query 500 was received (step 225). For example, as shown in FIG. 7C, the Employees table 134 stored in the shared buffer cache 135 is sent (step 615) to client 105*a* via session 114*b*.

Figure 7D:
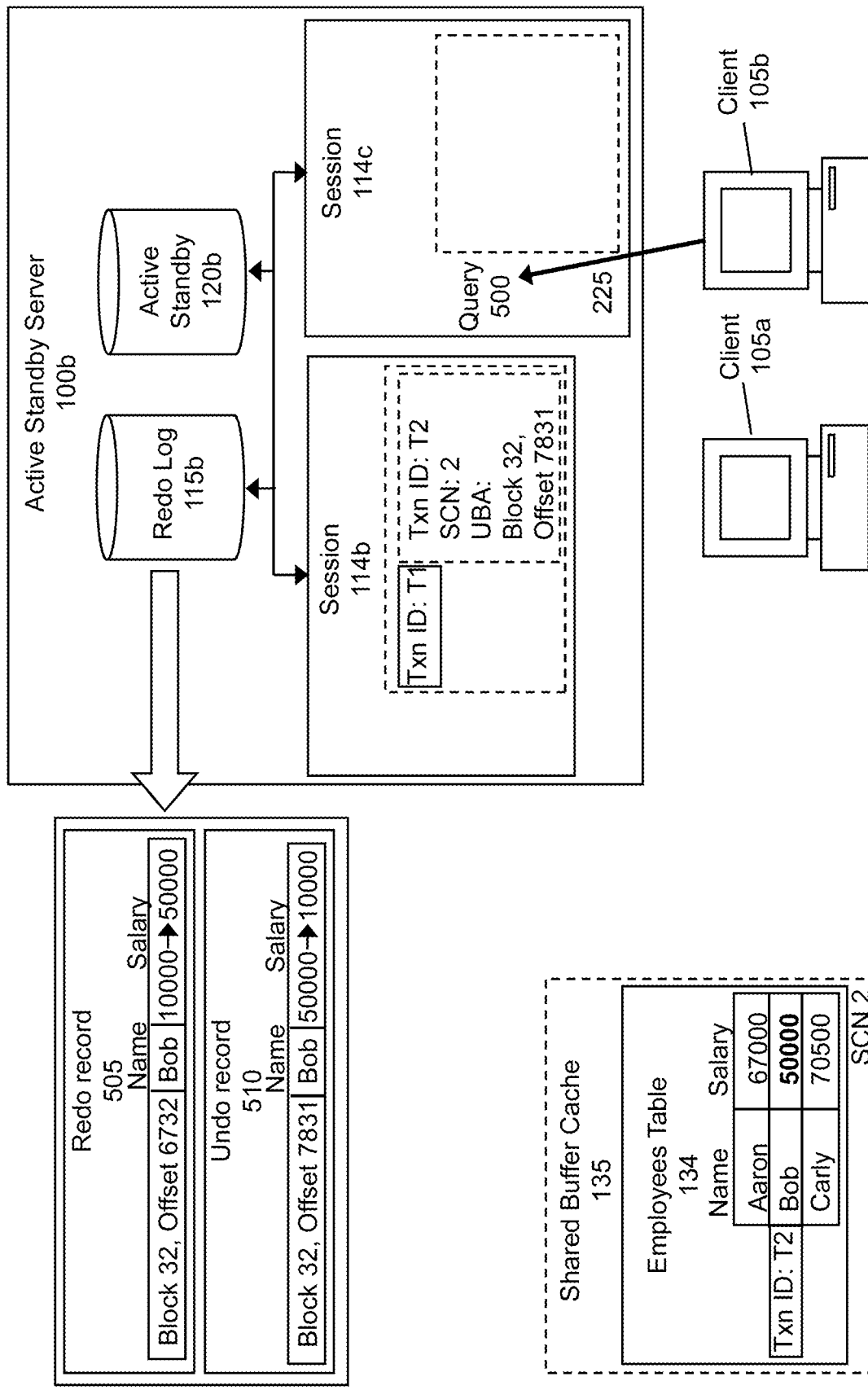

Referring again to FIG. 6, if the active standby server 100*b* determines (step 620) that the Txn ID associated with the session 114 in the active standby server 100*b* at which the query 500 was received (step 225) does not match the Txn ID associated with execution of the DML statement 140, one or more undo records 510 may be applied (step 625) to the data in the shared buffer cache 135. After the undo record(s) 510 are applied (step 625) to this data, the rolled-back data may be sent (step 630) to the session 114 in the active standby server 100*b* that received (step 225) the query 500. For example, as shown in FIG. 7D, session 114*c* is created at the active standby server 100*b* when the query 500 ("SELECT*FROM Employees;") is received (step 225) at the active standby server 100*b* from client 105*b*. Unlike session 114*b*, session 114*c* is not associated with Txn ID T2. Assuming again that the query 500 is received (step 225) not long after the record corresponding to Bob's salary in the Employees table 134 was updated from 10000 to 50000, the Employees table 134 is stored in the shared buffer cache 135 in conjunction with information indicating that the transaction that updated this data is associated with Txn ID T2 and SCN 2.

Figure 7E:
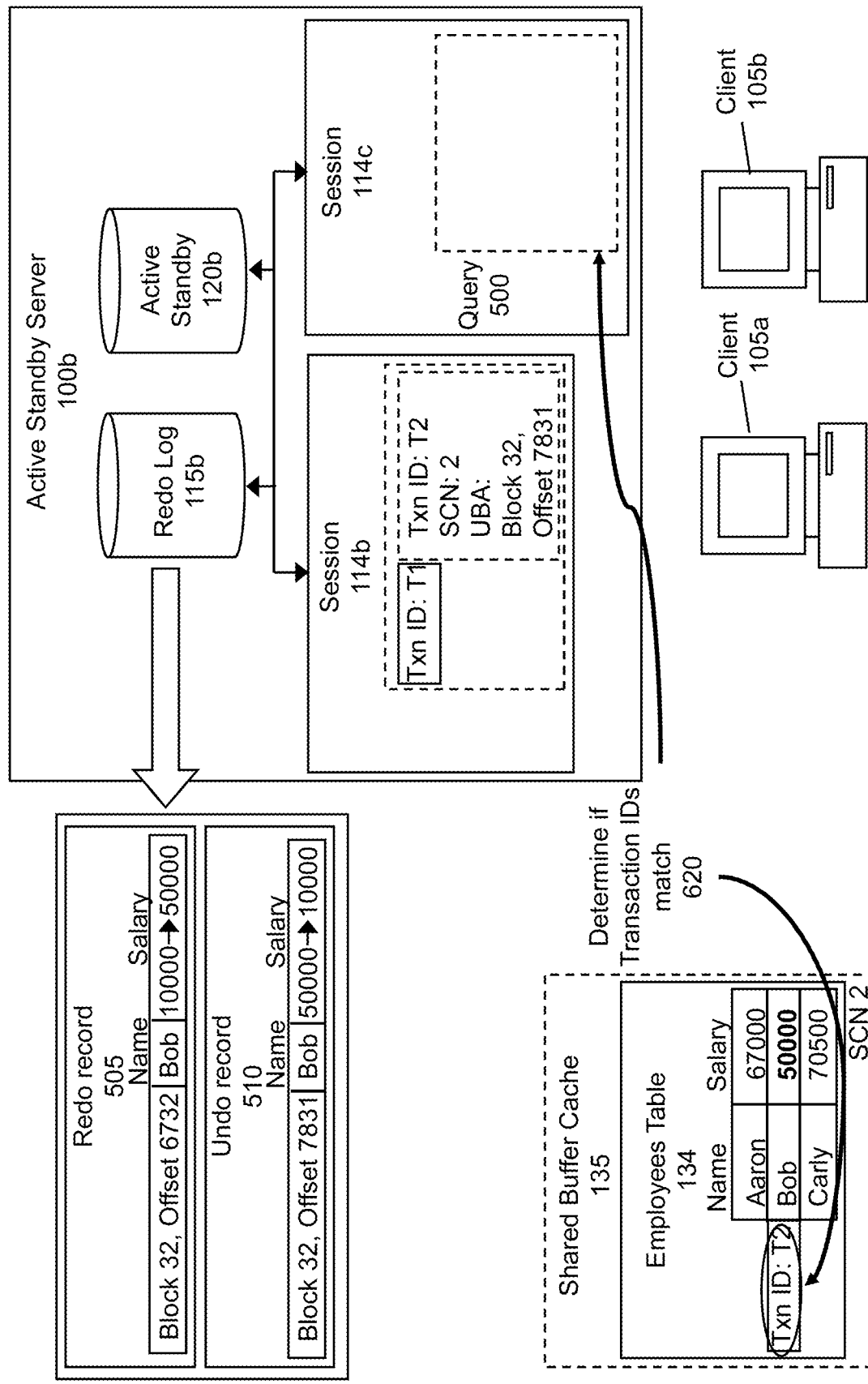

As shown in FIG. 7E, since the query 500 is directed to the Employees table 134 and the Txn ID associated with the most recent modification to the Employees table 134 is T2, the active standby server 100*b* may determine (step 620) whether the Txn ID associated with the Employees table 134 matches a Txn ID associated with this session 114*c*. Here, since the most recent modification to the Employees table 134 is associated with Txn ID T2 and the session 114*c* in the active standby server 100*b* is not associated with this Txn ID, the active standby server 100*b* determines (step 620) that the Txn ID associated with the Employees table 134 does not match a Txn ID associated with the session 114*c*.

Figure 7F:
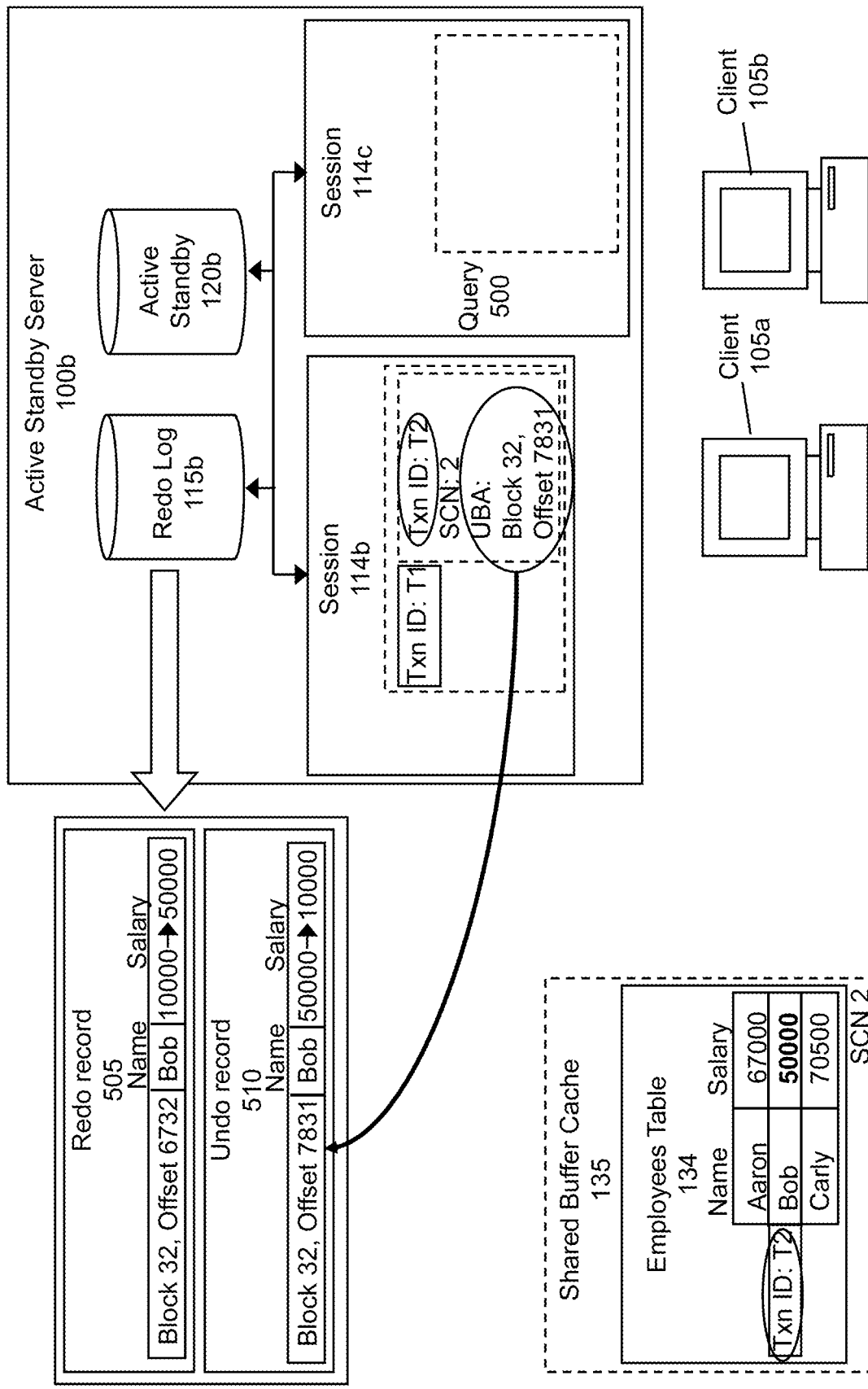
Figure 7G:
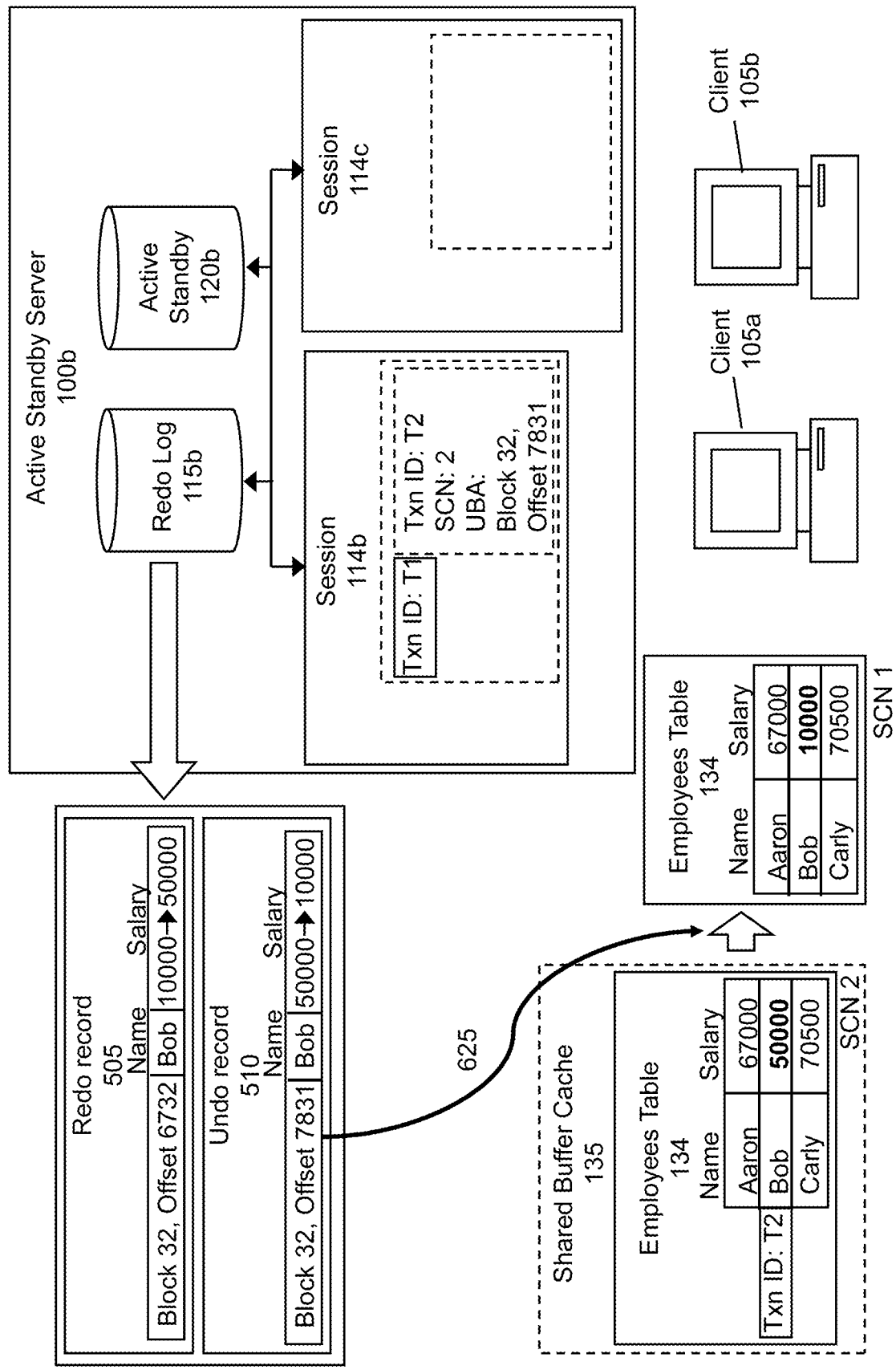
Figure 7H:
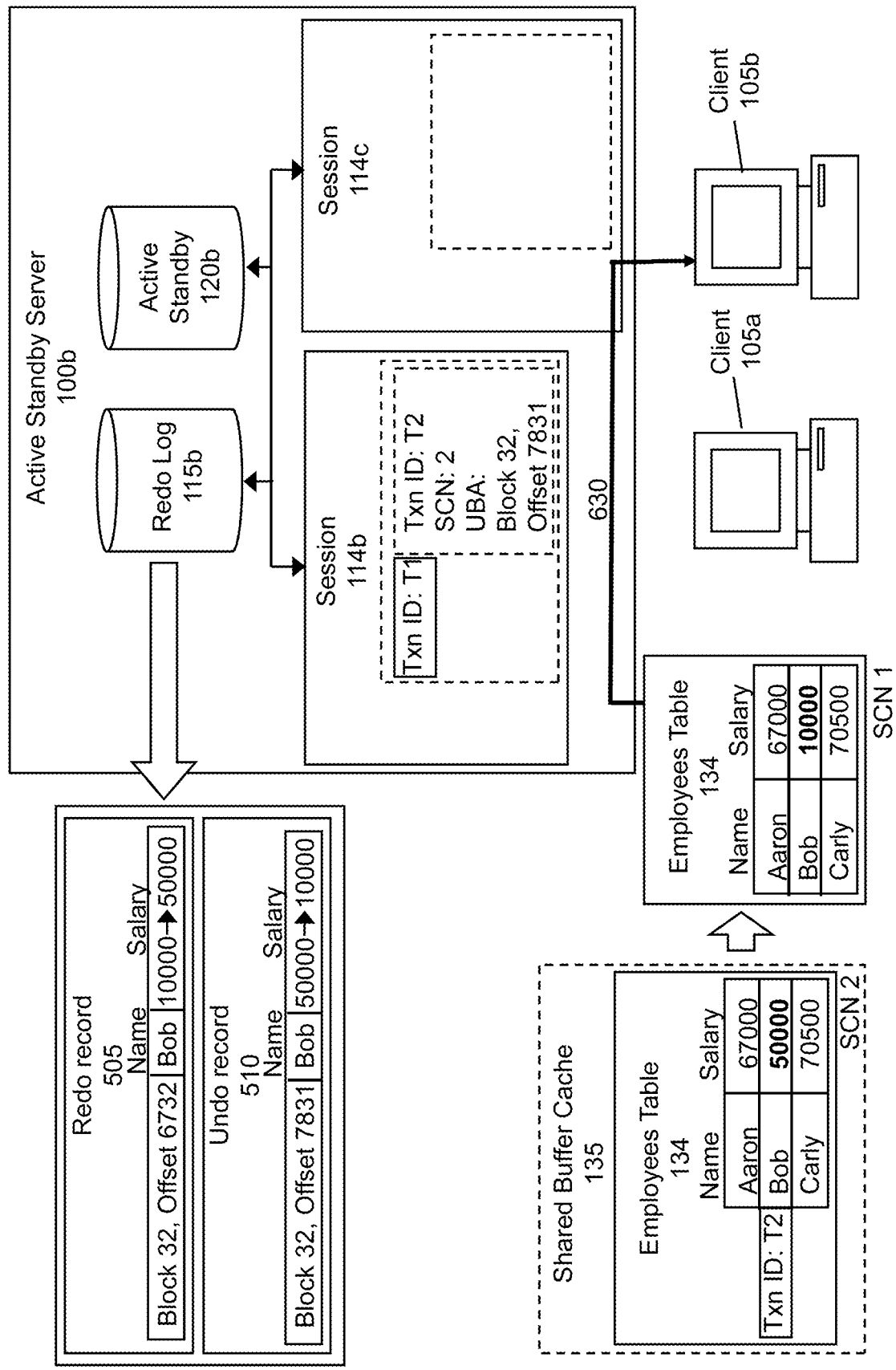

Upon determining (step 620) that the Txn ID associated with the Employees table 134 does not match a Txn ID associated with the session 114*c*, a set of undo record(s) 510 to be applied (step 625) to the Employees table 134 may be identified, as shown in FIG. 7F. Since the most recent modification to the Employees table 134 is associated with Txn ID T2, the undo record 510 having the UBA associated with this Txn ID (i.e., block 32, offset 7831) is identified. As shown in FIG. 7G, the undo record 510 is applied (step 625) to the Employees table 134 in the shared buffer cache 135, rolling back the value of Bob's salary from 50000 to 10000. Although not depicted in FIG. 7G, in some embodiments, a chain of undo records may have to be applied until the Employees table 134 that is obtained includes only committed changes and/or changes that are associated with Txn IDs that match Txn IDs associated with the session 114*c* at which the query 500 was received (step 225). Finally, as shown in FIG. 7H, the Employees table 134 having the rolled-back data may be sent (step 630) to the client 105*b* from which the query 500 was received (step 225) via session 114*c*. Therefore, data consistency is preserved for queries 500 directed to data that was changed within the same database session 114.

FIG. 8 is a flow chart for terminating a database session in a server on which an active standby database resides in response to a shutdown of a corresponding database session in a server on which a primary database resides according to some embodiments of the invention. Some of the steps illustrated in the flowchart are optional in different embodiments. In some embodiments, the steps may be performed in an order different from that described in FIG. 8. Some of the steps of FIG. 8 are discussed below in conjunction with FIGS. 9A-9F, which illustrate an example of terminating a database session in a server on which an active standby database resides in response to a shutdown of a corresponding database session in a server on which a primary database resides according to some embodiments of the invention.

Figure 9A:
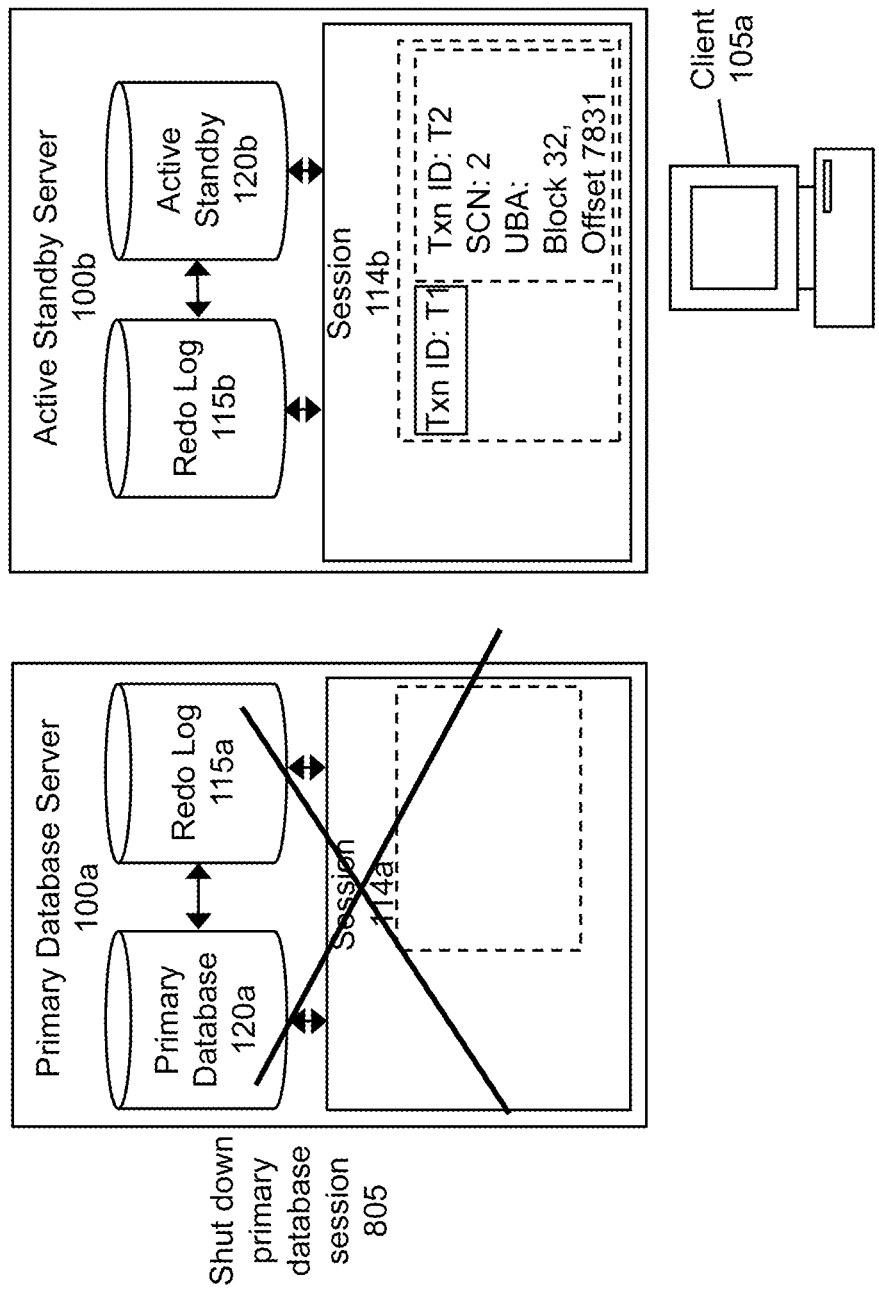
FIGS. 9A-9F illustrate an example of terminating a database session in a server on which an active standby database resides in response to a shutdown of a corresponding database session in a server on which a primary database resides according to some embodiments of the invention.

Referring first to FIG. 8, the flowchart begins when the session 114*a* in the primary database server 100*a* shuts down (step 805), which is shown in FIG. 9A. The session 114*a* may shut down (step 805) for various reasons. For example, the session 114*a* may shut down (step 805) if the primary database server 100*a* crashes. As an additional example, a user may shut down (step 805) the session 114*a* deliberately. In some embodiments, various architectures may characterize the primary database server 100*a* in the event the session 114*a* shuts down (step 805). For example, the primary database server 100*a* may be included in a cluster of database servers 100 that operate as a single system. As an additional example, a container database (CDB) may include a set of pluggable databases (PDBs) including a primary PDB and an active standby PDB. In this example, an equivalent of a shutdown of the session 114*a* at the primary database server 100*a* is a shutdown of the primary PDB of the CDB.

Figure 9B:
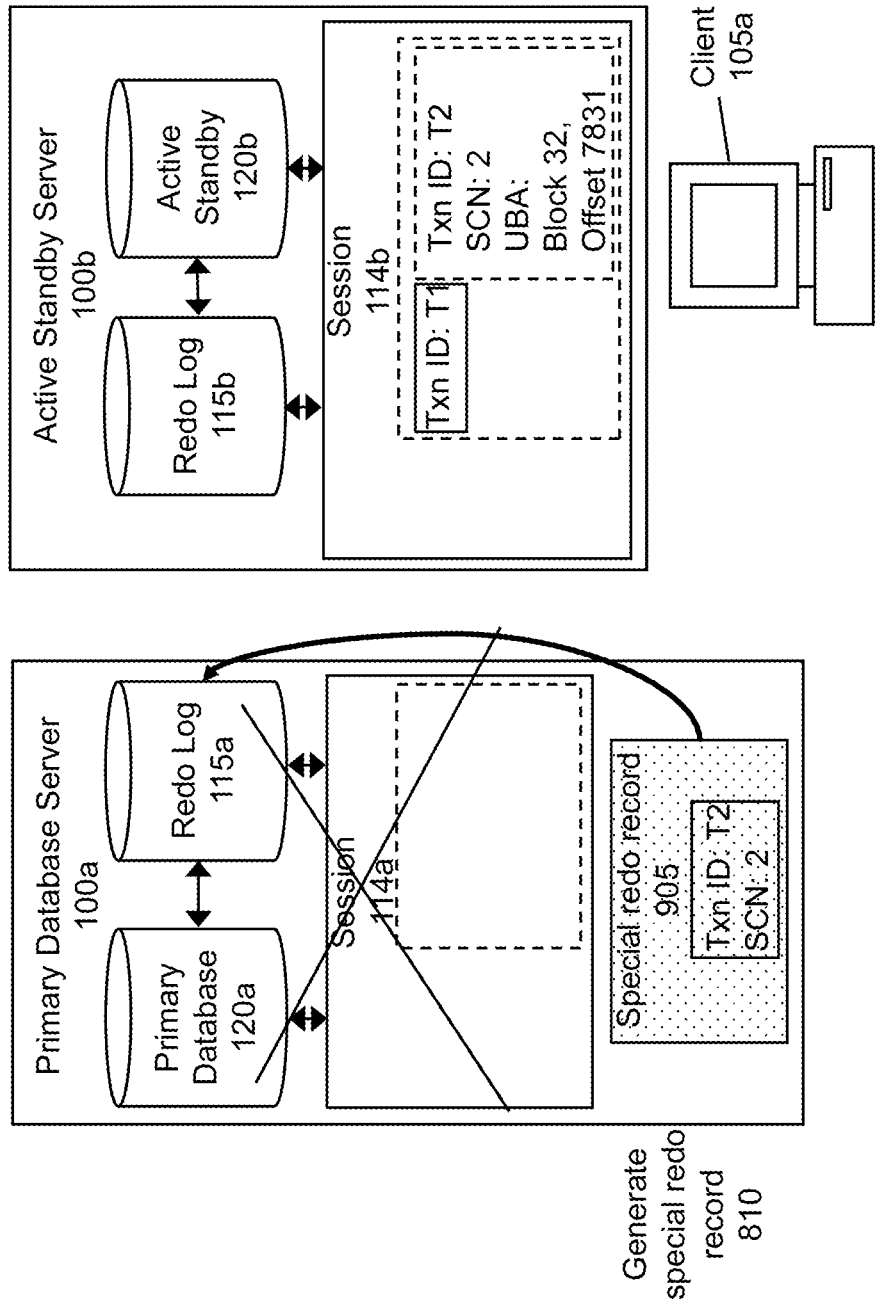

Special handling is required in order to ensure the correctness of results returned in response to queries 500 received at a session 114*b* in the active standby server 100*b* in the event the session 114*a* in the primary database server 100*a* associated with the session 114*b* in the active standby server 100*b* shuts down (step 805), as described in the remaining steps of FIG. 8. In response to the shutdown of the session 114*a* in the primary database server 100*a*, a special redo record is generated (step 810) at the primary database server 100*a* indicating that the session 114*a* in the primary database server 100*a* has shut down (step 805). This special redo record includes a Txn ID and an SCN. As shown in FIG. 9B, the special redo record 905 generated (step 810) at the primary database server 100*a* includes Txn ID T2 and SCN 2. In some embodiments, the special redo record 905 also may include additional types of information (e.g., information indicating why the session 114*a* was shut down (step 805)). Once generated (step 810), the special redo record 905 may be stored in the redo log 115*a* at the primary database server 100*a*.

Figure 9C:
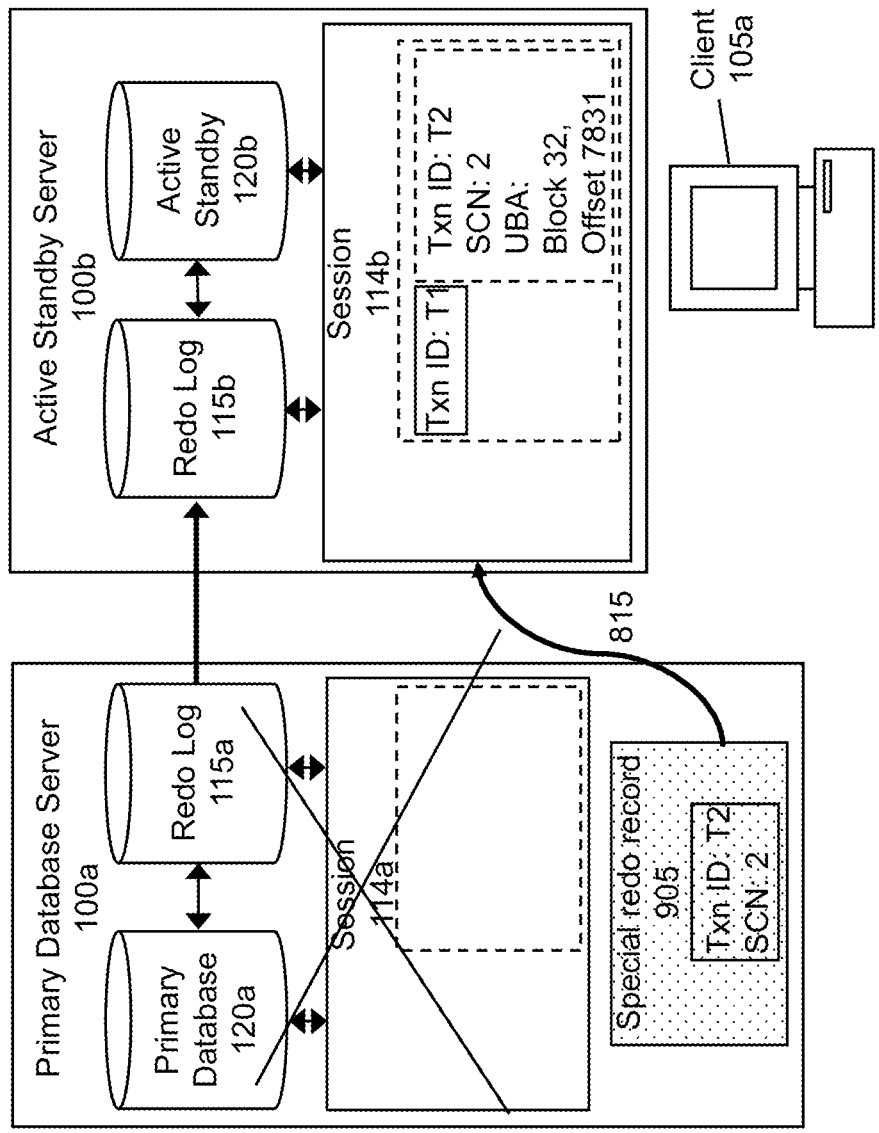

Referring again to FIG. 8, the special redo record 905 may be communicated (step 815) to the active standby server 100*b*, as shown in FIG. 9C. In some embodiments, the special redo record 905 may be communicated (step 815) to the active standby server 100*b* over a database link between the primary database server 100*a* and the active standby server 100*b*. Furthermore, as shown in FIG. 9C, in various embodiments, additional redo/undo records 505, 510 may also be communicated in conjunction with the special redo record 905 from the primary database server 100*a* to the active standby server 100*b*.

Figure 9D:
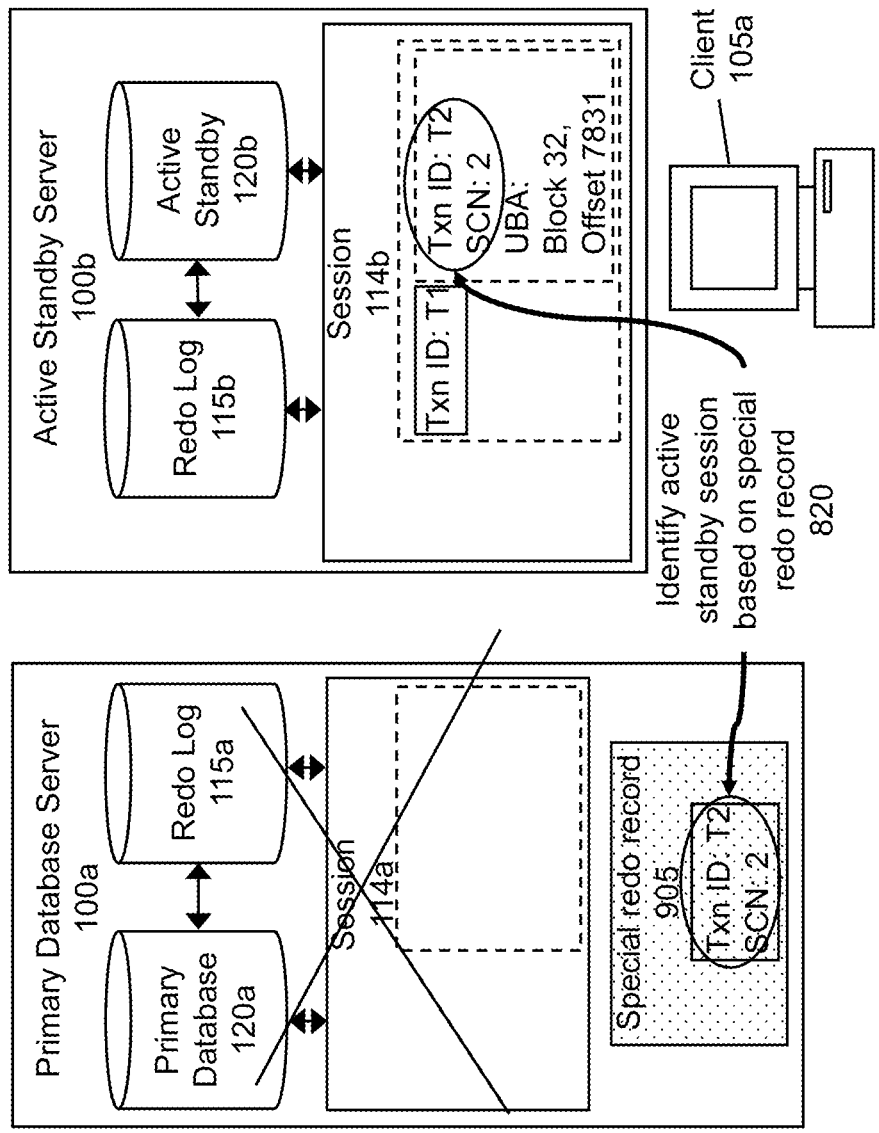

As shown in FIG. 8, after the special redo record 905 has been communicated (step 815) to the active standby server 100*a*, the active standby server 100*b* identifies (step 820) the session 114 in the active standby server 100*b* that was associated with the session 114*a* in the primary database server 100*a* that has been shut down (step 805). The session 114 in the active standby server 100*b* may be identified (step 820) based on the Txn ID and the SCN included in the special redo record 905. For example, as shown in FIG. 9D, since the special redo record 905 includes Txn T2 and SCN 2, which matches the Txn ID and SCN associated with session 114*b*, the active standby server 100*b* identifies (step 820) session 114*b* as the session 114 in the active standby server 100*b* that was associated with the session 114*a* in the primary database server 100*a* that has been shut down (step 805).

Figure 9E:
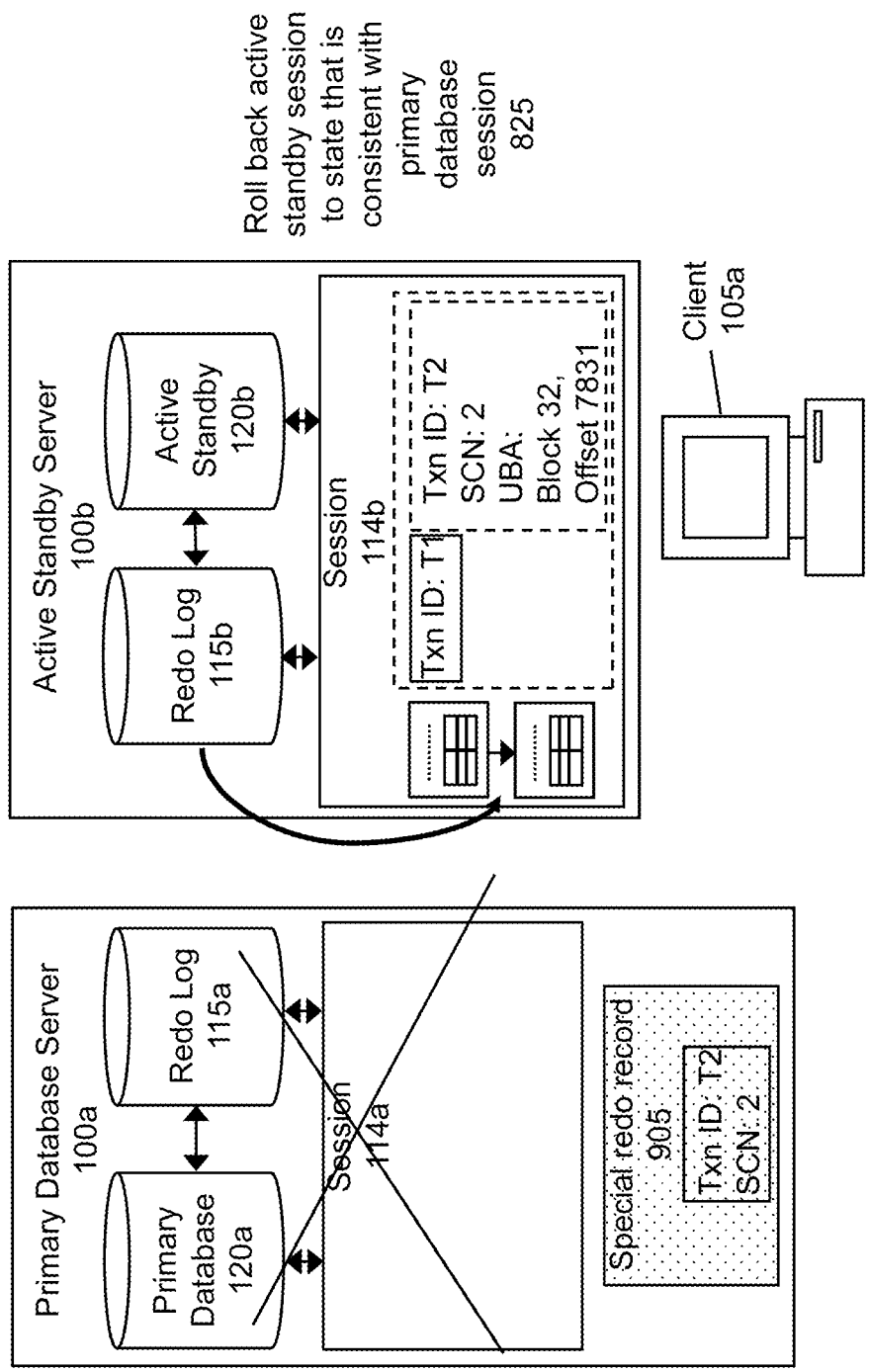
Figure 9F:
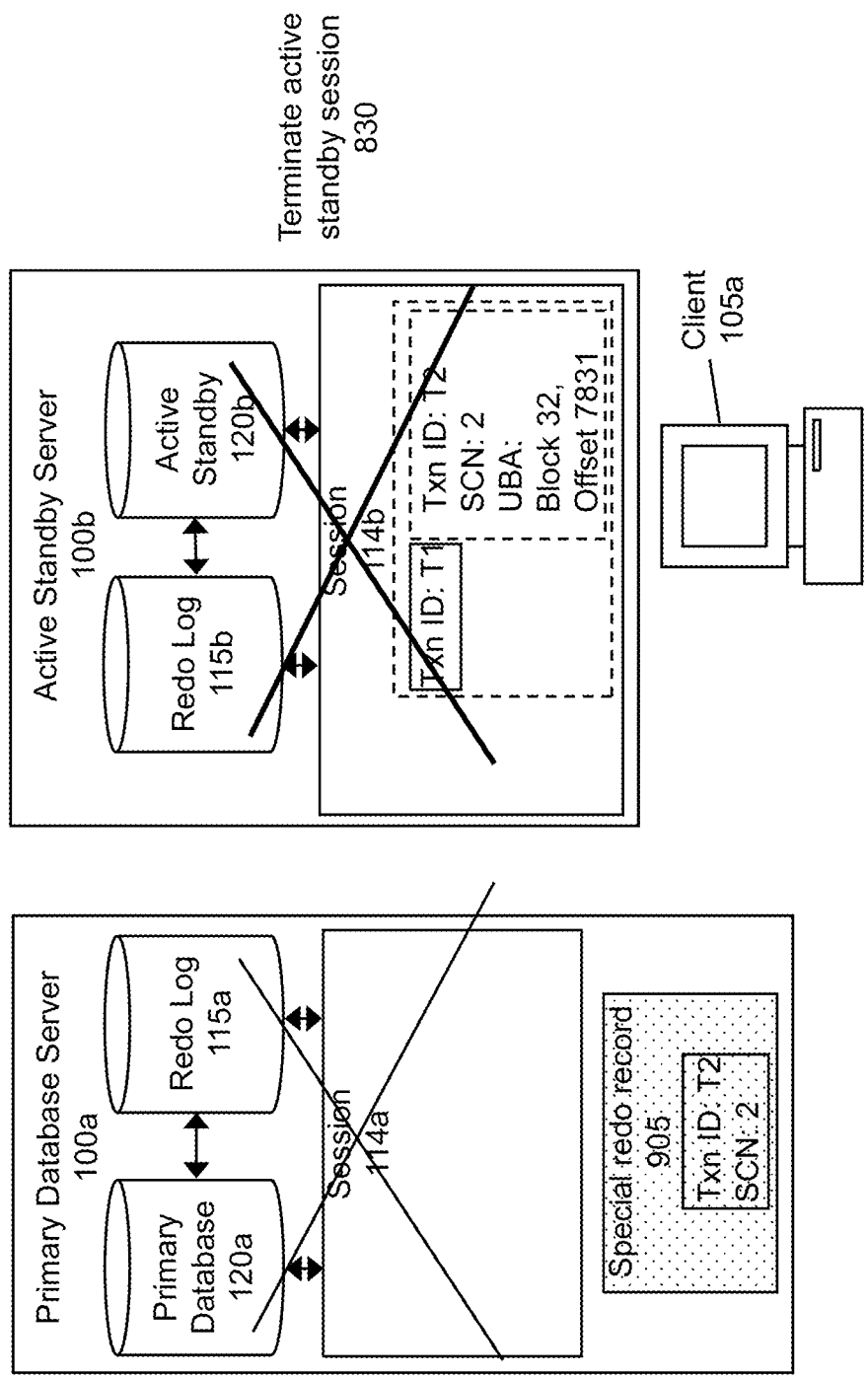

Referring again to FIG. 8, the active standby server 100*b* may then roll (step 825) the identified session 114*b* back to a state that is consistent with the session 114*a* in the primary database server 100*a* prior to its shutdown. Rollback of the identified session 114*b* is shown in FIG. 9E. Referring once more to FIG. 8, once the session 114b in the active standby server 100b is in a state that is consistent with that of the session 114a in the primary database server 100a prior to its shutdown, the session 114b in the active standby server 100b is terminated (step 830) as well, as illustrated in FIG. 9F.

System Architecture

Figure 10:
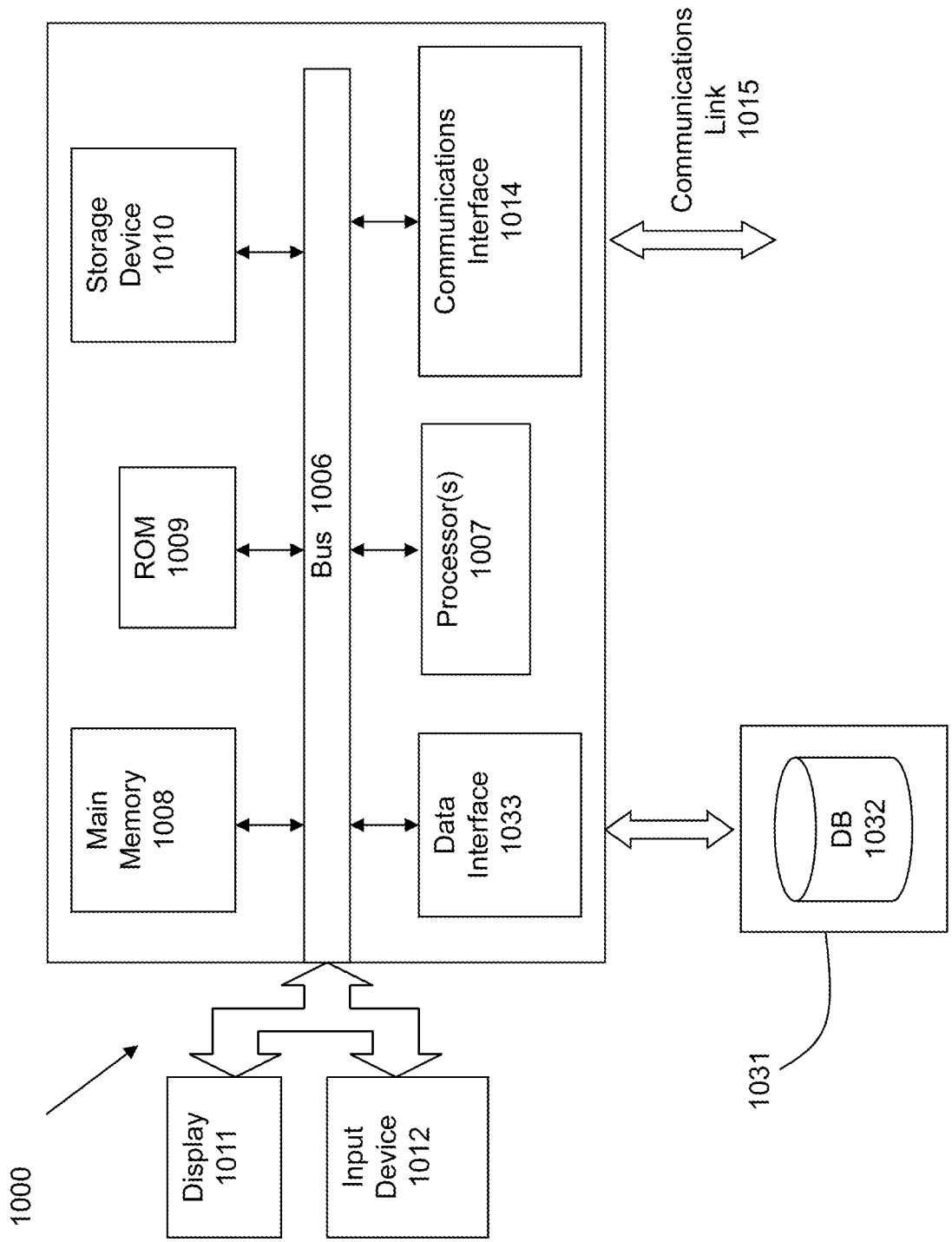
FIG. 10 is a block diagram of a computing system suitable for implementing an embodiment of the present invention.

FIG. 10 is a block diagram of an illustrative computing system 1000 suitable for implementing an embodiment of the present invention. Computer system 1000 includes a bus 1006 or other communication mechanism for communicating information, which interconnects subsystems and devices, such as processor 1007, system memory 1008 (e.g., RAM), static storage device 1009 (e.g., ROM), disk drive 1010 (e.g., magnetic or optical), communication interface 1014 (e.g., modem or Ethernet card), display 1011 (e.g., CRT or LCD), input device 1012 (e.g., keyboard), and cursor control.

According to some embodiments of the invention, computer system 1000 performs specific operations by processor 1007 executing one or more sequences of one or more instructions contained in system memory 1008. Such instructions may be read into system memory 1008 from another computer readable/usable medium, such as static storage device 1009 or disk drive 1010. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1000. According to other embodiments of the invention, two or more computer systems 1000 coupled by communication link 1010 (e.g., LAN, PTSN, or wireless network) may perform the sequence of instructions required to practice the invention in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010, or other non-volatile storage for later execution. A database 1032 in a storage medium 1031 may be used to store data accessible by the system 1000.

The techniques described may be implemented using various processing systems, such as clustered computing systems, distributed systems, and cloud computing systems.

In some embodiments, some or all of the database system described above may be part of a cloud computing system. Cloud computing systems may implement cloud computing services, including cloud communication, cloud storage, and cloud processing.

Figure 11:
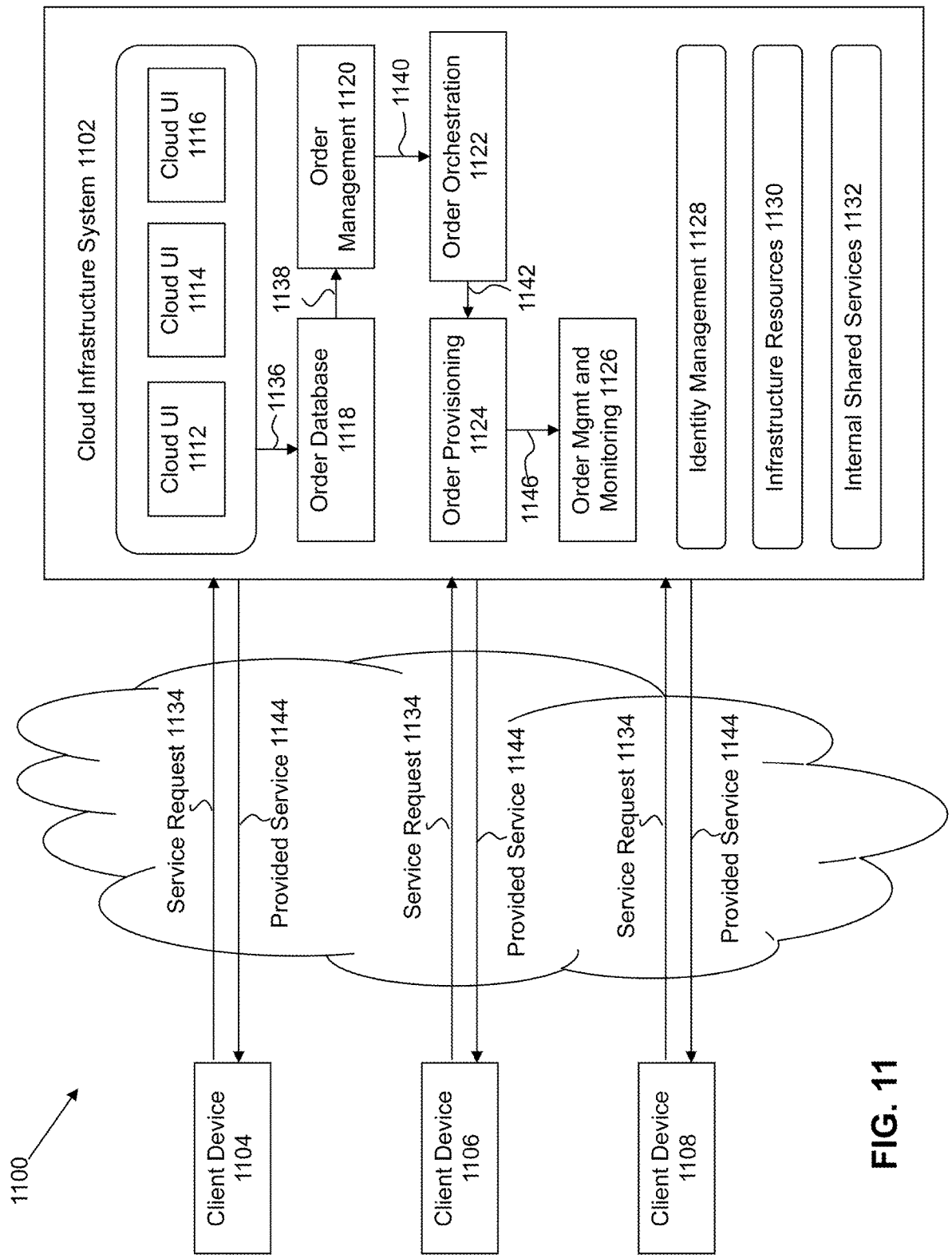
FIG. 11 is a block diagram of one or more components of a system environment by which services provided by one or more components of an embodiment system may be offered as cloud services, in accordance with an embodiment of the present disclosure.

FIG. 11 is a simplified block diagram of one or more components of a system environment 1100 by which services provided by one or more components of an embodiment system may be offered as cloud services, in accordance with an embodiment of the present disclosure. In the illustrated embodiment, system environment 1100 includes one or more client computing devices 1104, 1106, and 1108 that may be used by users to interact with a cloud infrastructure system 1102 that provides cloud services. The client computing devices may be configured to operate a client application such as a web browser, a proprietary client application, or some other application, which may be used by a user of the client computing device to interact with cloud infrastructure system 1102 to use services provided by cloud infrastructure system 1102.

It should be appreciated that cloud infrastructure system 1102 depicted in the figure may have other components than those depicted. Further, the embodiment shown in the figure is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for FIG. 6. Although system environment 1100 is shown with three client computing devices, any number of client computing devices may be supported. Other devices such as devices with sensors, etc. may interact with cloud infrastructure system 1102.

Network(s) 1110 may facilitate communications and exchange of data between clients 1104, 1106, and 1108 and cloud infrastructure system 1102. Each network may be any type of network familiar to those skilled in the art that can support data communications using any of a variety of commercially-available protocols. Cloud infrastructure system 1102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner.

In various embodiments, cloud infrastructure system 1102 may be adapted to automatically provision, manage and track a customer's subscription to services offered by cloud infrastructure system 1102. Cloud infrastructure system 1102 may provide the cloudservices via different deployment models. For example, services may be provided under a public cloud model in which cloud infrastructure system 1102 is owned by an organization selling cloud services and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 and by the services provided by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in the figure, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In operation 1134, a customer using a client device, such as client device 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI), cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

After an order has been placed by the customer, the order information is received via the cloud UIs, 1112, 1114 and/or 1116. At operation 1136, the order is stored in order database 1118. Order database 1118 can be one of several databases operated by cloud infrastructure system 1118 and operated in conjunction with other system elements. At operation 1138, the order information is forwarded to an order management module 1120. In some instances, order management module 1120 may be configured to perform billing and accounting functions related to the order, such as verifying the order, and upon verification, booking the order. At operation 1140, information regarding the order is communicated to an order orchestration module 1122. Order orchestration module 1122 may utilize the order information to orchestrate the provisioning of services and resources for the order placed by the customer. In some instances, order orchestration module 1122 may orchestrate the provisioning of resources to support the subscribed services using the services of order provisioning module 1124.

In certain embodiments, order orchestration module 1122 enables the management of business processes associated with each order and applies business logic to determine whether an order should proceed to provisioning. At operation 1142, upon receiving an order for a new subscription, order orchestration module 1122 sends a request to order provisioning module 1124 to allocate resources and configure those resources needed to fulfill the subscription order. Order provisioning module 1124 enables the allocation of resources for the services ordered by the customer. Order provisioning module 1124 provides a level of abstraction between the cloud services provided by cloud infrastructure system 1102 and the physical implementation layer that is used to provision the resources for providing the requested services. Order orchestration module 1122 may thus be isolated from implementation details, such as whether or not services and resources are actually provisioned on the fly or pre-provisioned and only allocated/assigned upon request.

At operation 1144, once the services and resources are provisioned, a notification of the provided service may be sent to customers on client devices 1104, 1106 and/or 1108 by order provisioning module 1124 of cloud infrastructure system 1102.

At operation 1146, the customer's subscription order may be managed and tracked by an order management and monitoring module 1126. In some instances, order management and monitoring module 1126 may be configured to collect usage statistics for the services in the subscription order, such as the amount of storage used, the amount data transferred, the number of users, and the amount of system up time and system down time.

In certain embodiments, cloud infrastructure system 1102 may include an identity management module 1128. Identity management module 1128 may be configured to provide identity services, such as access management and authorization services in cloud infrastructure system 1102. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for maintaining data consistency on an active standby database and a primary database, the method comprising:
    receiving a data manipulation language (DML) statement at a database session in an active standby server on which an active standby database resides, the DML statement pertaining to a change to the active standby database; and
    maintaining data consistency on the active standby database at least by:
        redirecting the DML statement from the active standby server to the primary database; and
        applying a redo record to the active standby database, the redo record generated by executing the DML statement on the primary database; and
    returning a result set, by the active standby server, in response to an execution of a query based at least in part upon a determination result of whether the query pertains to information associated with execution of the DML statement in the database session, the query received after the execution of the DML statement in the database session.

2. The method of claim 1, further comprising:
    receiving the query at the active standby database;
    executing the DML statement on the primary database to cause a change to the primary database;
    generating the redo record for the change; and transmitting the redo record in a redo stream to the active standby database for application of the redo record to the active standby database.

3. The method of claim 1, further comprising:
identifying a first database session in which the query is received for execution; and
determining whether the first database session matches the database session at which the DML statement was received.

4. The method of claim 3, further comprising:
when a match is determined between the first database session and the database session in which the DML statement was received,
 executing the query against the active standby database to generate a first result set, the first result set including the change; and
 returning the first result including the change to the active standby database to a requesting entity of the query.

5. The method of claim 3, further comprising:
when a mismatch is determined between the first database session and the database session in which the DML statement was received,
 identifying an undo record for the change;
 undoing the change made by the DML statement to the active standby database at least by applying the undo record to the active standby database;
 generating a second result set for the query at least by executing the query against the active standby database after the undo record has been applied; and
 returning the second result set to a requesting entity of the query.

6. The method of claim 1, further comprising:
responsive to redirecting the DML statement from the active standby server to the primary database,
 creating a database session associated with the database session in the active standby server in a primary database server on which the primary database resides; and
 suspending the database session in the active standby server.

7. The method of claim 1, wherein executing the DML statement on the primary database further comprises:
making the change to data on the primary database to which the DML statement is redirected;
generating the redo record comprising first information associated with execution of the DML statement on the primary database; and
generating an undo record comprising second information associated with the change to the data in response to the execution of the DML statement on the primary database.

8. The method of claim 7, wherein executing the DML statement on the primary database further comprises:
in response to redirecting the DML statement to the primary database, suspending the database session in the active standby server; and
after the redo record has been applied to corresponding data stored in the active standby database,
 returning control to the database session in the active standby server;
 receiving one or more additional queries at the database session in the active standby server; and
 executing the one or more additional queries.

9. A computer program product embodied on a non-transitory computer readable medium having stored thereon a sequence of instructions which, when executed by a processor, causes the processor to execute a set of acts for maintaining data consistency on an active standby database and a primary database, the set of acts comprising:
receiving a data manipulation language (DML) statement at a database session in an active standby server on which an active standby database resides, the DML statement pertaining to a change to the active standby database; and
maintaining data consistency on the active standby database at least by:
 redirecting the DML statement from the active standby server to the primary database; and
 applying a redo record to the active standby database, the redo record generated by executing the DML statement on the primary database; and
returning a result set, by the active standby server, in response to an execution of a query based at least in part upon a determination result of whether the query pertains to information associated with execution of the DML statement in the database session, the query received after the execution of the DML statement in the database session.

10. The computer program product of claim 9, the set of acts further comprising:
receiving the query at the active standby database;
executing the DML statement on the primary database to cause a change to the primary database;
generating the redo record for the change; and
transmitting the redo record in a redo stream to the active standby database for application of the redo record to the active standby database.

11. The computer program product of claim 9, the set of acts further comprising:
identifying a first database session in which the query is received for execution; and
determining whether the first database session matches the database session at which the DML statement was received.

12. The computer program product of claim 11, the set of acts further comprising:
when a match is determined between the first database session and the database session in which the DML statement was received,
 executing the query against the active standby database to generate a first result set, the first result set including the change; and
 returning the first result including the change to the active standby database to a requesting entity of the query.

13. The computer program product of claim 11, the set of acts further comprising:
when a mismatch is determined between the first database session and the database session in which the DML statement was received,
 identifying an undo record for the change;
 undoing the change made by the DML statement to the active standby database at least by applying the undo record to the active standby database;
 generating a second result set for the query at least by executing the query against the active standby database after the undo record has been applied; and
 returning the second result set to a requesting entity of the query.

14. The computer program product of claim 9, the set of acts further comprising:
responsive to redirecting the DML statement from the active standby server to the primary database, creating a database session associated with the database session in the active standby server in a primary database server on which the primary database resides; and suspending the database session in the active standby server.

15. A computer system to implement a method for supporting data consistency on an active standby database after redirecting a Data Manipulation Language (DML) statement to a primary database, comprising:

a memory for storing data and instructions; and a processor that executes a sequence of instructions which, when executed by the processor causes the processor to execute a set of acts, the set of acts comprising:

receiving a data manipulation language (DML) statement at a database session in an active standby server on which an active standby database resides, the DML statement pertaining to a change to the active standby database; and maintaining data consistency on the active standby database at least by:

redirecting the DML statement from the active standby server to the primary database; and applying a redo record to the active standby database, the redo record generated by executing the DML statement on the primary database; and returning a result set, by the active standby server, in response to an execution of a query based at least in part upon a determination result of whether the query pertains to information associated with execution of the DML statement in the database session, the query received after the execution of the DML statement in the database session.

16. The computer system of claim 15, the memory further storing the instructions which, when executed by the processor, further causes the processor to perform the set of acts, and the set of acts further comprising:

receiving the query at the active standby database;

executing the DML statement on the primary database to cause a change to the primary database;

generating the redo record for the change; and transmitting the redo record in a redo stream to the active standby database for application of the redo record to the active standby database.

17. The computer system of claim 15, the memory further storing the instructions which, when executed by the processor, further causes the processor to perform the set of acts, and the set of acts further comprising:

identifying a first database session in which the query is received for execution; and determining whether the first database session matches the database session at which the DML statement was received.

18. The computer system of claim 17, the memory further storing the instructions which, when executed by the processor, further causes the processor to perform the set of acts, and the set of acts further comprising:

when a match is determined between the first database session and the database session in which the DML statement was received, executing the query against the active standby database to generate a first result set, the first result set including the change; and returning the first result including the change to the active standby database to a requesting entity of the query.

19. The computer system of claim 17, the memory further storing the instructions which, when executed by the processor, further causes the processor to perform the set of acts, and the set of acts further comprising:

when a mismatch is determined between the first database session and the database session in which the DML statement was received, identifying an undo record for the change;

undoing the change made by the DML statement to the active standby database at least by applying the undo record to the active standby database;

generating a second result set for the query at least by executing the query against the active standby database after the undo record has been applied; and returning the second result set to a requesting entity of the query.

20. The computer system of claim 15, the memory further storing the instructions which, when executed by the processor, further causes the processor to perform the set of acts, and the set of acts further comprising:

responsive to redirecting the DML, statement from the active standby server to the primary database, creating a database session associated with the database session in the active standby server in a primary database server on which the primary database resides; and suspending the database session in the active standby server.

* * * * *

UNITED STATES PATENT AND TRADEMARK OFFICE
CERTIFICATE OF CORRECTION

PATENT NO. : 11,847,110 B2  
APPLICATION NO. : 17/202024  
DATED : December 19, 2023  
INVENTOR(S) : Sonawane et al.

Page 1 of 1

It is certified that error appears in the above-identified patent and that said Letters Patent is hereby corrected as shown below:

On the Title Page

On page 2, Column 1, Item (56) under Other Publications, Line 5, delete "writepy" and insert -- write --, therefor.

On page 2, Column 2, Item (56) under Other Publications, Line 20, delete "(HDR)"," and insert -- (HADR)", --, therefor.

In the Specification

In Column 3, Line 45, delete "DML," and insert -- DML --, therefor.

In Column 11, Line 7, delete "DML," and insert -- DML --, therefor.

In Column 13, Line 29, delete "DML," and insert -- DML --, therefor.

In Column 19, Line 19, delete "cloudservices" and insert -- cloud services --, therefor.

In Column 20, Line 24, delete "cloudservices" and insert -- cloud services --, therefor.

In the Claims

In Column 25, Line 16, in Claim 15, delete "data manipulation language (DML)" and insert -- DML --, therefor.

In Column 26, Line 41, in Claim 20, delete "DML," and insert -- DML --, therefor.

Signed and Sealed this  
Seventh Day of May, 2024

Katherine Kelly Vidal  
*Director of the United States Patent and Trademark Office*